United States Patent
Zhou et al.

(10) Patent No.: US 12,356,388 B2
(45) Date of Patent: Jul. 8, 2025

(54) NETWORK CODING WITH USER EQUIPMENT COOPERATION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/832,450

(22) Filed: Jun. 3, 2022

(65) Prior Publication Data

US 2023/0397182 A1    Dec. 7, 2023

(51) Int. Cl.
*H04W 72/044*    (2023.01)
*H04W 72/23*    (2023.01)
*H04W 80/02*    (2009.01)
*H04W 92/18*    (2009.01)

(52) U.S. Cl.
CPC ....... *H04W 72/0466* (2013.01); *H04W 72/23* (2023.01); *H04W 80/02* (2013.01); *H04W 92/18* (2013.01)

(58) Field of Classification Search
CPC . H04W 92/18; H04W 72/0466; H04W 72/23; H04W 80/02; H04L 1/0075; H04L 1/0076; H04L 1/06; H04L 1/1671; H04L 2001/0097; G06N 3/08

See application file for complete search history.

(56) References Cited

U.S. PATENT DOCUMENTS

| | | | | |
|---|---|---|---|---|
| 7,478,056 | B1* | 1/2009 | Lu | G06Q 30/02 705/37 |
| 8,780,693 | B2* | 7/2014 | Kim | H04W 40/00 370/231 |
| 9,788,355 | B2* | 10/2017 | Sharma | H04W 36/033 |
| 9,872,290 | B2* | 1/2018 | Maaref | H04L 5/0016 |
| 9,980,305 | B2* | 5/2018 | Li | H04W 72/54 |
| 10,201,003 | B2* | 2/2019 | Guo | H04W 72/12 |
| 10,225,713 | B2* | 3/2019 | Wu | H04N 21/41407 |
| 10,411,863 | B2* | 9/2019 | Yu | H04L 1/0077 |
| 11,509,433 | B2* | 11/2022 | Kimura | H04L 1/1819 |
| 11,522,646 | B2* | 12/2022 | Nakanishi | H04L 5/0055 |
| 11,528,096 | B2* | 12/2022 | Kitamura | H04L 1/1614 |

(Continued)

OTHER PUBLICATIONS

International Search Report and Written Opinion—PCT/US2023/067176—ISA/EPO—Sep. 15, 2023.

*Primary Examiner* — Dung B Huynh
(74) *Attorney, Agent, or Firm* — Patterson+ Sheridan, L.L.P.

(57) ABSTRACT

Certain aspects of the present disclosure provide techniques for method of wireless communication by a target user equipment (UE), comprising receiving, from a network entity, signaling configuring the target UE with at least one set of parameters for a network coding scheme, receiving, while connected to a cooperative UE via a sidelink, network coded sub-packets from the network entity, receiving, from the cooperative UE via the sidelink, at least one of network coded sub-packets or original sub-packets, decoding the network coded sub-packets received from at least one of the network entity or the cooperative UE, based on the network coding scheme, to recover one or more original packets.

22 Claims, 16 Drawing Sheets

(56) References Cited

U.S. PATENT DOCUMENTS

| | | | | |
|---|---|---|---|---|
| 11,825,560 B2* | 11/2023 | Panteleev | H04L 1/1861 |
| 11,863,319 B2* | 1/2024 | Zhou | H04L 1/1819 |
| 12,082,027 B2* | 9/2024 | Mittal | H04W 24/10 |
| 2006/0251062 A1* | 11/2006 | Jain | H04L 45/02 | 370/389 |
| 2008/0171554 A1* | 7/2008 | Chao | H04L 1/0015 | 455/450 |
| 2010/0195488 A1* | 8/2010 | Mehrotra | H04L 47/25 | 370/216 |
| 2011/0171964 A1* | 7/2011 | Lin | H04L 5/0048 | 455/450 |
| 2011/0216179 A1* | 9/2011 | Dialameh | A61F 9/08 | 348/E7.085 |
| 2012/0076025 A1* | 3/2012 | Barbieri | H04W 24/10 | 370/252 |
| 2012/0329448 A1* | 12/2012 | Lim | H04W 92/20 | 455/422.1 |
| 2013/0019136 A1* | 1/2013 | Vafin | H04L 1/008 | 714/751 |
| 2013/0195106 A1* | 8/2013 | Calmon | H04L 45/24 | 370/389 |
| 2013/0294247 A1* | 11/2013 | Zhu | H04W 72/52 | 370/235 |
| 2013/0329774 A1* | 12/2013 | Potharaju | H04B 7/0413 | 375/224 |
| 2014/0010162 A1* | 1/2014 | Cho | H04L 5/0035 | 370/328 |
| 2014/0047303 A1* | 2/2014 | Vafin | H04L 1/0057 | 714/776 |
| 2014/0086152 A1* | 3/2014 | Bontu | H04W 4/70 | 370/329 |
| 2014/0086153 A1* | 3/2014 | Bontu | H04W 4/70 | 370/329 |
| 2014/0098731 A1* | 4/2014 | Maaref | H04W 76/40 | 370/312 |
| 2014/0112288 A1* | 4/2014 | Wei | H04W 48/20 | 370/329 |
| 2014/0127991 A1* | 5/2014 | Lim | H04W 76/14 | 455/39 |
| 2014/0135019 A1* | 5/2014 | Jang | H04W 36/302 | 455/437 |
| 2014/0140188 A1* | 5/2014 | Shattil | H04B 7/026 | 370/208 |
| 2014/0146916 A1* | 5/2014 | Shattil | H04J 13/004 | 375/295 |
| 2014/0177456 A1* | 6/2014 | Boudreau | H04L 1/0003 | 370/252 |
| 2014/0192732 A1* | 7/2014 | Chen | H04L 1/003 | 370/328 |
| 2014/0206372 A1* | 7/2014 | Zeng | H04W 28/0278 | 455/450 |
| 2014/0269289 A1* | 9/2014 | Effros | H04L 47/18 | 370/231 |
| 2014/0274183 A1* | 9/2014 | Zhu | H04W 72/541 | 455/513 |
| 2015/0036529 A1* | 2/2015 | Zhang | H04L 1/0026 | 370/252 |
| 2015/0036574 A1* | 2/2015 | Uemura | H04W 52/0229 | 370/311 |
| 2015/0082133 A1* | 3/2015 | Cao | H03M 13/612 | 714/807 |
| 2015/0195818 A1* | 7/2015 | Davydov | H04W 72/23 | 370/329 |
| 2015/0195819 A1* | 7/2015 | Kwon | H04L 1/0026 | 370/329 |
| 2015/0195863 A1* | 7/2015 | Reznik | H04W 28/0215 | 370/236 |
| 2015/0208431 A1* | 7/2015 | Chen | H04W 72/30 | 370/329 |
| 2015/0230224 A1* | 8/2015 | Maaref | H04L 5/0035 | 455/451 |
| 2015/0282247 A1* | 10/2015 | Batchu | H04W 56/003 | 370/311 |
| 2015/0296443 A1* | 10/2015 | Lim | H04L 5/0048 | 370/312 |
| 2016/0036565 A1 | 2/2016 | Maaref et al. |
| 2016/0066296 A1* | 3/2016 | Su | H04W 64/003 | 455/458 |
| 2016/0100390 A1* | 4/2016 | Kuo | H04B 1/7107 | 370/329 |
| 2016/0128123 A1* | 5/2016 | Li | H04B 7/024 | 370/252 |
| 2016/0174189 A1* | 6/2016 | Yoshizawa | H04W 76/28 | 455/458 |
| 2016/0242036 A1* | 8/2016 | Van Phan | H04W 12/04 |
| 2016/0249368 A1* | 8/2016 | Sadiq | H04L 1/0027 |
| 2016/0309471 A1* | 10/2016 | Lee | H04L 5/00 |
| 2016/0323065 A1* | 11/2016 | Zhu | H04L 1/0041 |
| 2016/0381690 A1* | 12/2016 | Kim | H04W 72/541 | 370/329 |
| 2017/0031762 A1* | 2/2017 | Luan | G06F 11/108 |
| 2017/0099327 A1* | 4/2017 | Negaluguli | H04L 1/0015 |
| 2017/0111280 A1* | 4/2017 | Zhang | H04W 28/16 |
| 2017/0223713 A1* | 8/2017 | Chang | H04W 72/0453 |
| 2017/0223735 A1* | 8/2017 | Damnjanovic | H04W 72/21 |
| 2017/0318615 A1* | 11/2017 | Ou | H04B 7/026 |
| 2017/0331670 A1* | 11/2017 | Parkvall | H04L 41/0816 |
| 2017/0339530 A1* | 11/2017 | Maaref | H04L 5/0055 |
| 2018/0092017 A1* | 3/2018 | Freda | H04W 76/23 |
| 2018/0145805 A1* | 5/2018 | Maaref | H04W 4/80 |
| 2018/0176955 A1* | 6/2018 | Salem | H04W 74/0808 |
| 2018/0242393 A1* | 8/2018 | Wei | H04W 28/26 |
| 2018/0359050 A1* | 12/2018 | Lauridsen | H04L 1/0011 |
| 2018/0359790 A1* | 12/2018 | Ingale | H04W 72/51 |
| 2019/0020381 A1* | 1/2019 | Tooher | H04W 88/04 |
| 2019/0028179 A1* | 1/2019 | Kalhan | H04B 7/15521 |
| 2019/0028232 A1* | 1/2019 | Kalhan | H04L 1/1825 |
| 2019/0045333 A1* | 2/2019 | Serbetci | H04L 1/0011 |
| 2019/0097754 A1* | 3/2019 | Yu | H04L 1/20 |
| 2019/0150187 A1* | 5/2019 | Park | H04L 5/0094 | 370/330 |
| 2019/0159230 A1* | 5/2019 | Kim | H04W 72/23 |
| 2019/0190644 A1* | 6/2019 | Ugurlu | H04L 27/2607 |
| 2019/0238212 A1* | 8/2019 | Kalhan | H04W 52/48 |
| 2019/0253121 A1* | 8/2019 | Islam | H04B 7/0626 |
| 2019/0268930 A1* | 8/2019 | Rudolf | H04L 1/1614 |
| 2019/0274054 A1* | 9/2019 | Salem | H04L 12/189 |
| 2019/0296873 A1* | 9/2019 | Gupta | H04B 7/024 |
| 2019/0312708 A1* | 10/2019 | Bai | H04L 1/0016 |
| 2019/0334686 A1* | 10/2019 | Li | H04L 5/0053 |
| 2019/0357305 A1* | 11/2019 | Su | H04W 88/04 |
| 2020/0036414 A1* | 1/2020 | Shattil | H04B 1/0003 |
| 2020/0067634 A1* | 2/2020 | Medard | H04L 1/0041 |
| 2020/0067665 A1* | 2/2020 | Dou | H04L 5/0035 |
| 2020/0119849 A1* | 4/2020 | Su | H04B 7/026 |
| 2020/0127775 A1* | 4/2020 | Su | H04L 1/1854 |
| 2020/0141229 A1* | 5/2020 | Croux | H04B 11/00 |
| 2020/0154490 A1* | 5/2020 | Xiang | H04L 5/0048 |
| 2020/0163083 A1* | 5/2020 | Yu | H04W 72/044 |
| 2020/0178216 A1* | 6/2020 | Huang | H04W 72/0473 |
| 2020/0178241 A1* | 6/2020 | Wu | H04L 5/0055 |
| 2020/0195321 A1* | 6/2020 | Black | H04B 7/0408 |
| 2020/0205051 A1* | 6/2020 | Takehana | H04B 7/15542 |
| 2020/0252909 A1* | 8/2020 | Yu | H04W 80/08 |
| 2020/0259600 A1* | 8/2020 | Cao | H04L 1/0057 |
| 2020/0275425 A1* | 8/2020 | Cao | H04L 1/0003 |
| 2020/0322208 A1* | 10/2020 | Nakamura | H04L 27/3488 |
| 2020/0322939 A1* | 10/2020 | Cao | H04W 72/02 |
| 2020/0336178 A1* | 10/2020 | Ma | H04B 7/0452 |
| 2020/0336256 A1* | 10/2020 | Chen | H04B 7/0665 |
| 2020/0337021 A1* | 10/2020 | Zhang | H04L 1/08 |
| 2020/0358557 A1* | 11/2020 | Park | H03M 13/618 |
| 2020/0367299 A1* | 11/2020 | Ryu | H04W 8/005 |
| 2020/0404663 A1* | 12/2020 | Zhang | H04W 76/11 |
| 2020/0413425 A1* | 12/2020 | Lin | H04L 5/0064 |
| 2021/0013991 A1* | 1/2021 | Park | H04W 72/23 |
| 2021/0028842 A1* | 1/2021 | Kim | H04B 7/0628 |
| 2021/0037601 A1* | 2/2021 | Xu | H04W 88/04 |
| 2021/0051646 A1* | 2/2021 | Maaref | H04W 72/02 |

(56) References Cited

U.S. PATENT DOCUMENTS

| | | | |
|---|---|---|---|
| 2021/0056535 A1* | 2/2021 | Xu | G06Q 20/38215 |
| 2021/0112553 A1* | 4/2021 | Hosseini | H04W 72/52 |
| 2021/0120478 A1* | 4/2021 | Akl | H04L 1/06 |
| 2021/0127402 A1* | 4/2021 | Lee | H04W 72/56 |
| 2021/0143949 A1* | 5/2021 | Zhao | H04W 16/22 |
| 2021/0153086 A1* | 5/2021 | Kim | H04W 80/08 |
| 2021/0160668 A1* | 5/2021 | Park | H03M 13/3761 |
| 2021/0176743 A1* | 6/2021 | Maaref | H04L 5/0035 |
| 2021/0204245 A1* | 7/2021 | Raghavan | H04W 4/70 |
| 2021/0212165 A1* | 7/2021 | Schober | H04L 5/0098 |
| 2021/0258201 A1* | 8/2021 | Sengupta | H04L 5/0094 |
| 2021/0289580 A1* | 9/2021 | Damnjanovic | H04W 24/02 |
| 2021/0297988 A1* | 9/2021 | Zhou | H04L 1/1819 |
| 2021/0328643 A1* | 10/2021 | Damnjanovic | H04L 1/0003 |
| 2021/0328725 A1* | 10/2021 | Jassal | H04L 1/1614 |
| 2021/0336725 A1* | 10/2021 | Zhou | H04L 1/1845 |
| 2021/0336896 A1* | 10/2021 | Calmon | H04L 47/29 |
| 2021/0377842 A1* | 12/2021 | Xu | H04W 76/14 |
| 2021/0392472 A1* | 12/2021 | Zhou | H04L 1/1896 |
| 2021/0399826 A1* | 12/2021 | Lee | H04W 72/23 |
| 2022/0006493 A1* | 1/2022 | Wang | H04B 7/0617 |
| 2022/0014318 A1* | 1/2022 | Zhou | H04L 1/0005 |
| 2022/0015057 A1* | 1/2022 | Bao | H04W 76/14 |
| 2022/0015069 A1 | 1/2022 | Zhou et al. | |
| 2022/0029733 A1* | 1/2022 | Ye | H04B 7/1851 |
| 2022/0053431 A1* | 2/2022 | Boudreau | H04W 52/243 |
| 2022/0104273 A1* | 3/2022 | Gou | H04W 72/1273 |
| 2022/0104248 A1* | 3/2022 | Elshafie | H04L 1/1893 |
| 2022/0123983 A1* | 4/2022 | Levitsky | H04L 27/2678 |
| 2022/0131657 A1* | 4/2022 | Elshafie | H04L 1/0076 |
| 2022/0141258 A1* | 5/2022 | Rice | H04L 65/65 370/352 |
| 2022/0150032 A1* | 5/2022 | Lee | H04W 56/00 |
| 2022/0217690 A1* | 7/2022 | Liu | H04W 76/14 |
| 2022/0217761 A1* | 7/2022 | Oh | H04L 5/0094 |
| 2022/0224445 A1* | 7/2022 | Xu | H04L 1/1822 |
| 2022/0225346 A1* | 7/2022 | Zewail | H04W 72/12 |
| 2022/0248377 A1* | 8/2022 | Elshafie | H04L 1/0016 |
| 2022/0256559 A1* | 8/2022 | Ding | H04W 72/23 |
| 2022/0263605 A1* | 8/2022 | Huang | H04L 1/1845 |
| 2022/0272678 A1* | 8/2022 | Zhang | H04W 72/02 |
| 2022/0272742 A1* | 8/2022 | Xiang | H04L 5/0064 |
| 2022/0294594 A1* | 9/2022 | Wang | H04J 11/0059 |
| 2022/0295442 A1* | 9/2022 | Goyal | H04W 64/00 |
| 2022/0304085 A1* | 9/2022 | Lee | H04W 76/23 |
| 2022/0317232 A1* | 10/2022 | Manolakos | H04W 72/51 |
| 2022/0322319 A1* | 10/2022 | Liao | H04W 72/23 |
| 2022/0322415 A1* | 10/2022 | Wu | H04W 52/346 |
| 2022/0329878 A1* | 10/2022 | Da Silva Martins | H04N 21/2187 |
| 2022/0330209 A1* | 10/2022 | Ding | H04W 28/12 |
| 2022/0330232 A1* | 10/2022 | Sridharan | H04L 1/0041 |
| 2022/0330362 A1* | 10/2022 | Dai | H04W 24/10 |
| 2022/0337291 A1* | 10/2022 | Hussa | H04L 67/04 |
| 2022/0338219 A1* | 10/2022 | Ding | H04W 72/23 |
| 2022/0353711 A1* | 11/2022 | Ying | H04W 72/1263 |
| 2022/0361091 A1* | 11/2022 | Kang | H04W 48/14 |
| 2022/0368455 A1* | 11/2022 | Schellmann | H04L 1/0026 |
| 2022/0368505 A1* | 11/2022 | Zhang | H04L 5/0055 |
| 2022/0369287 A1* | 11/2022 | Abotabl | H04W 72/563 |
| 2022/0369359 A1* | 11/2022 | Baek | H04W 72/23 |
| 2022/0377706 A1* | 11/2022 | Kittichokechai | H04L 5/0094 |
| 2022/0385393 A1* | 12/2022 | Li | H04L 1/0003 |
| 2022/0386341 A1* | 12/2022 | Oved | H04L 1/1896 |
| 2022/0394433 A1* | 12/2022 | Xu | H04W 4/08 |
| 2022/0394725 A1* | 12/2022 | Wang | H04W 76/14 |
| 2023/0008727 A1* | 1/2023 | Damnjanovic | H04W 88/04 |
| 2023/0038205 A1* | 2/2023 | Wang | H04W 72/569 |
| 2023/0060629 A1* | 3/2023 | Abotabl | H04L 1/0003 |
| 2023/0060991 A1* | 3/2023 | Lyu | H04W 72/23 |
| 2023/0082507 A1* | 3/2023 | McMenamy | H04W 72/20 370/315 |
| 2023/0085423 A1* | 3/2023 | Kubo | H04W 28/04 370/230 |
| 2023/0087316 A1* | 3/2023 | Zhou | H04W 72/0466 370/329 |
| 2023/0117189 A1* | 4/2023 | Kim | H04L 1/0072 370/329 |
| 2023/0131882 A1* | 4/2023 | Lin | H04W 72/0446 370/329 |
| 2023/0140213 A1* | 5/2023 | Awadin | H04L 5/0044 370/329 |
| 2023/0156858 A1* | 5/2023 | Freda | H04W 76/28 370/329 |
| 2023/0171800 A1* | 6/2023 | Taherzadeh Boroujeni | H04L 27/2646 370/329 |
| 2023/0188257 A1* | 6/2023 | Le Bars | H04L 1/06 370/328 |
| 2023/0189252 A1* | 6/2023 | Lee | H04W 72/1263 370/329 |
| 2023/0189298 A1* | 6/2023 | Lee | H04L 1/1864 |
| 2023/0189370 A1* | 6/2023 | Park | H04L 1/1854 370/329 |
| 2023/0198702 A1* | 6/2023 | Kim | H04L 27/2601 370/329 |
| 2023/0209317 A1* | 6/2023 | Liu | H04B 7/15521 370/329 |
| 2023/0217478 A1* | 7/2023 | Oh | H04L 1/0003 370/329 |
| 2023/0275685 A1* | 8/2023 | Yao | H04L 1/0009 |
| 2023/0275734 A1* | 8/2023 | Bai | H04L 5/0048 370/329 |
| 2023/0300692 A1* | 9/2023 | Ashari | H04L 5/14 370/331 |
| 2023/0300790 A1* | 9/2023 | Jung | H04W 76/11 370/329 |
| 2023/0319931 A1* | 10/2023 | Zhou | H04W 76/18 370/216 |
| 2023/0325679 A1* | 10/2023 | Wang | G06N 3/045 706/25 |
| 2023/0336213 A1* | 10/2023 | Kim | H04W 72/21 |
| 2023/0354407 A1* | 11/2023 | Ganesan | H04W 72/02 |
| 2023/0361913 A1* | 11/2023 | Wu | H04L 1/0075 |
| 2023/0371061 A1* | 11/2023 | Hwang | H04W 72/56 |
| 2023/0371111 A1* | 11/2023 | Xu | H04L 65/1069 |
| 2023/0379954 A1* | 11/2023 | Hosseini | H04W 72/542 |
| 2023/0388045 A1* | 11/2023 | Khoshnevisan | H04L 1/0009 |
| 2023/0397034 A1* | 12/2023 | Ko | H04W 28/02 |
| 2023/0413264 A1* | 12/2023 | Liu | H04L 1/0025 |
| 2024/0014981 A1* | 1/2024 | Yang | G06N 3/096 |
| 2024/0049344 A1* | 2/2024 | Zheng | H04L 1/1812 |
| 2024/0073886 A1* | 2/2024 | Singh | H04W 72/23 |
| 2024/0089955 A1* | 3/2024 | Matsumura | H04L 5/0091 |
| 2024/0097755 A1* | 3/2024 | Liu | H04B 7/0481 |
| 2024/0107530 A1* | 3/2024 | Tamrakar | H04W 72/1268 |
| 2024/0121025 A1* | 4/2024 | Zhang | H04W 52/262 |
| 2024/0121769 A1* | 4/2024 | Ma | H04L 5/0048 |
| 2024/0137073 A1* | 4/2024 | Wang | H04B 7/026 |
| 2024/0163959 A1* | 5/2024 | Cheng | H04W 76/14 |
| 2024/0179679 A1* | 5/2024 | Zhang | H04W 68/02 |
| 2024/0187181 A1* | 6/2024 | Zhao | H04L 5/0048 |
| 2024/0205990 A1* | 6/2024 | Yuan | H04W 76/14 |
| 2024/0214900 A1* | 6/2024 | Chang | H04W 40/22 |
| 2024/0236941 A1* | 7/2024 | Esswie | H04W 68/02 |
| 2024/0243835 A1* | 7/2024 | Takahashi | H04W 24/10 |
| 2024/0250793 A1* | 7/2024 | Manolakos | H04W 8/005 |
| 2024/0259906 A1* | 8/2024 | Freda | H04W 36/0079 |
| 2024/0267150 A1* | 8/2024 | Liang | H04L 1/0009 |
| 2024/0284157 A1* | 8/2024 | Back | H04W 76/18 |
| 2024/0288585 A1* | 8/2024 | Barbu | G01S 19/06 |
| 2024/0298350 A1* | 9/2024 | Alfarhan | H04W 74/0808 |

* cited by examiner

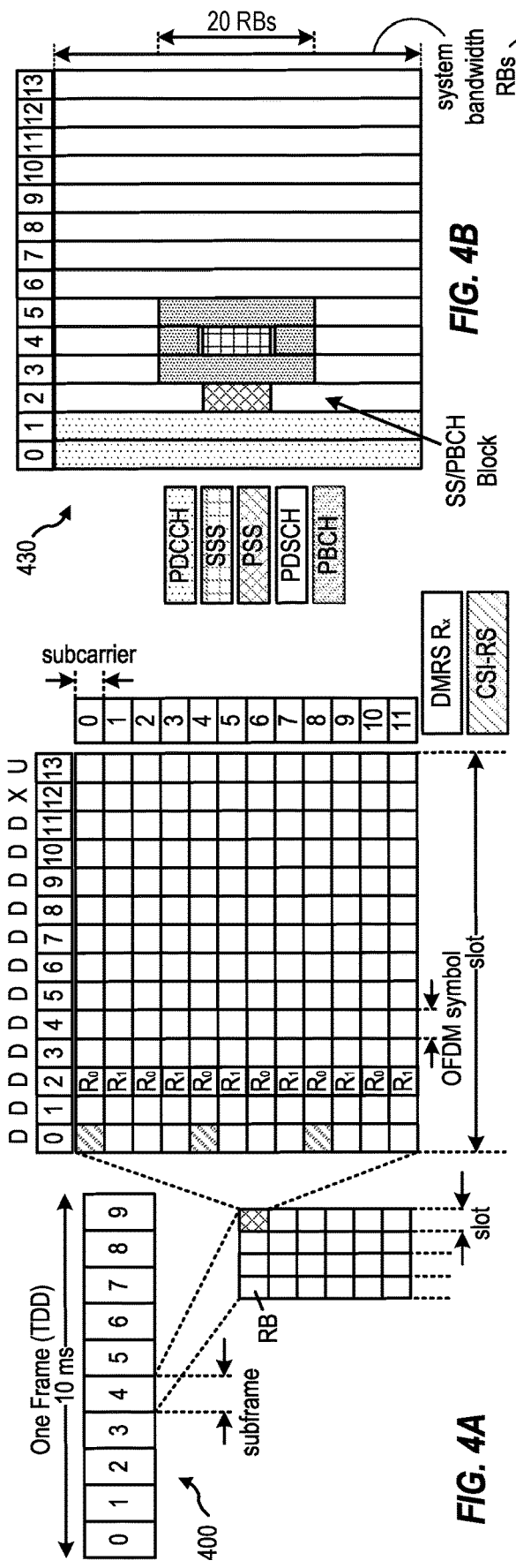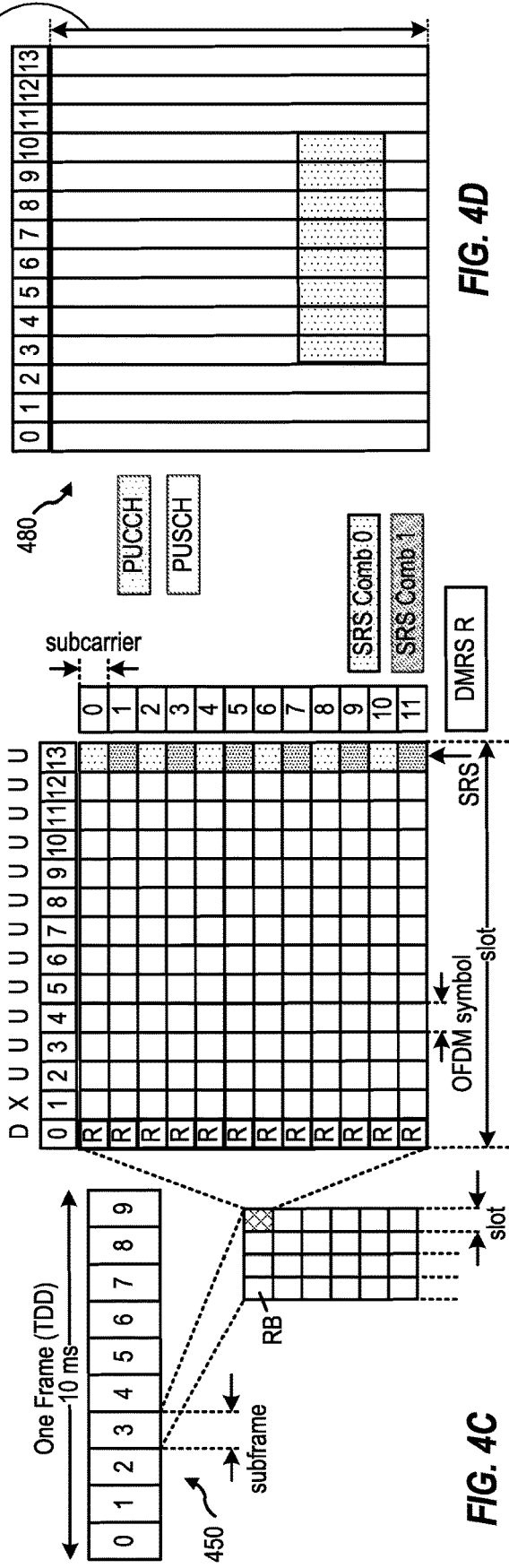

NETWORK CODING WITH USER EQUIPMENT COOPERATION

BACKGROUND

Field of the Disclosure

Aspects of the present disclosure relate to wireless communications, and more particularly, to techniques for using network coding schemes with assistance from a cooperative user equipment (UE).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a target user equipment (UE). The method includes receiving, from a network entity, signaling configuring the target UE with at least one set of parameters for a network coding scheme; receiving, while connected to a cooperative UE via a sidelink, network coded sub-packets from the network entity; receiving, from the cooperative UE via the sidelink, at least one of network coded sub-packets or original sub-packets; and decoding the network coded sub-packets received from at least one of the network entity or the cooperative UE, based on the network coding scheme, to recover one or more original packets.

Another aspect provides a method of wireless communications by a cooperative UE. The method includes receiving, from a network entity, signaling configuring the cooperative UE with resources for a sidelink for communicating with a target UE; receiving, while connected to a target UE via the sidelink, network coded sub-packets from the network entity; and transmitting, to the target UE via the sidelink, at least one of the network coded sub-packets or original sub-packets.

Another aspect provides a method of wireless communications by a network entity. The method includes transmitting signaling configuring a target UE with at least one set of parameters for a network coding scheme; encoding original sub-packets, based on the network coding scheme, to generate network coded sub-packets; transmitting at least a first set of the network coded sub-packets to the target UE; and transmitting at least a second set of the network coded sub-packets to a cooperative UE connected to the target UE.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure relate to wireless communications, and more particularly, to techniques for using network coding schemes with assistance from a cooperative user equipment (UE).

Network coding generally refers to a technique where operations (e.g., algebraic algorithms), are performed on packets as they pass through nodes within a network. This is in contrast to traditional routing networks, where packets are simply cached and then forwarded to the next node downstream in the network. Network coding typically merges relevant messages at a node, using a given encoding, then forwards the accumulated result to a destination/receiver for decoding.

Network coding may be used in wireless communication systems to improve system throughput, reduce latency, and reduce power consumption for communication between a UE and a base station. Unfortunately, there are times when the link between the UE and base station may not be of sufficient quality to reliably deliver network coded (NC) packets.

Aspects of the present disclosure, however, may utilize a cooperative UE to assist in delivering NC packets from a base station to a UE. A cooperative UE essentially provides multiple paths for the delivery of NC packets from a base station, which may help increase the likelihood NC packets are successfully received, using existing network infrastructure. Using cooperative UEs to assist in delivering network coded packets, as described herein, may help achieve improved reliability, reduced latency, balanced system loading, and reduced power consumption.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
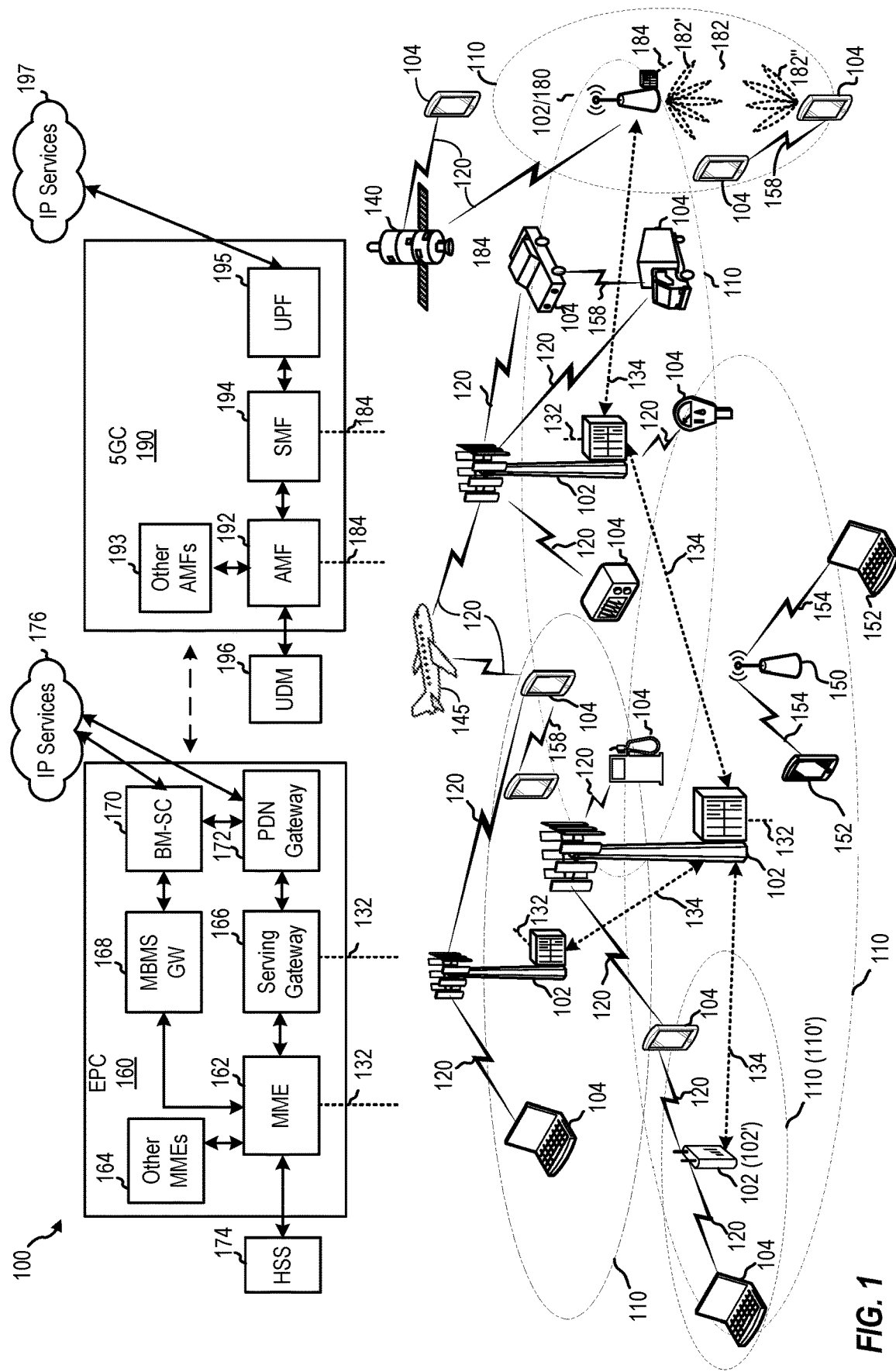
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
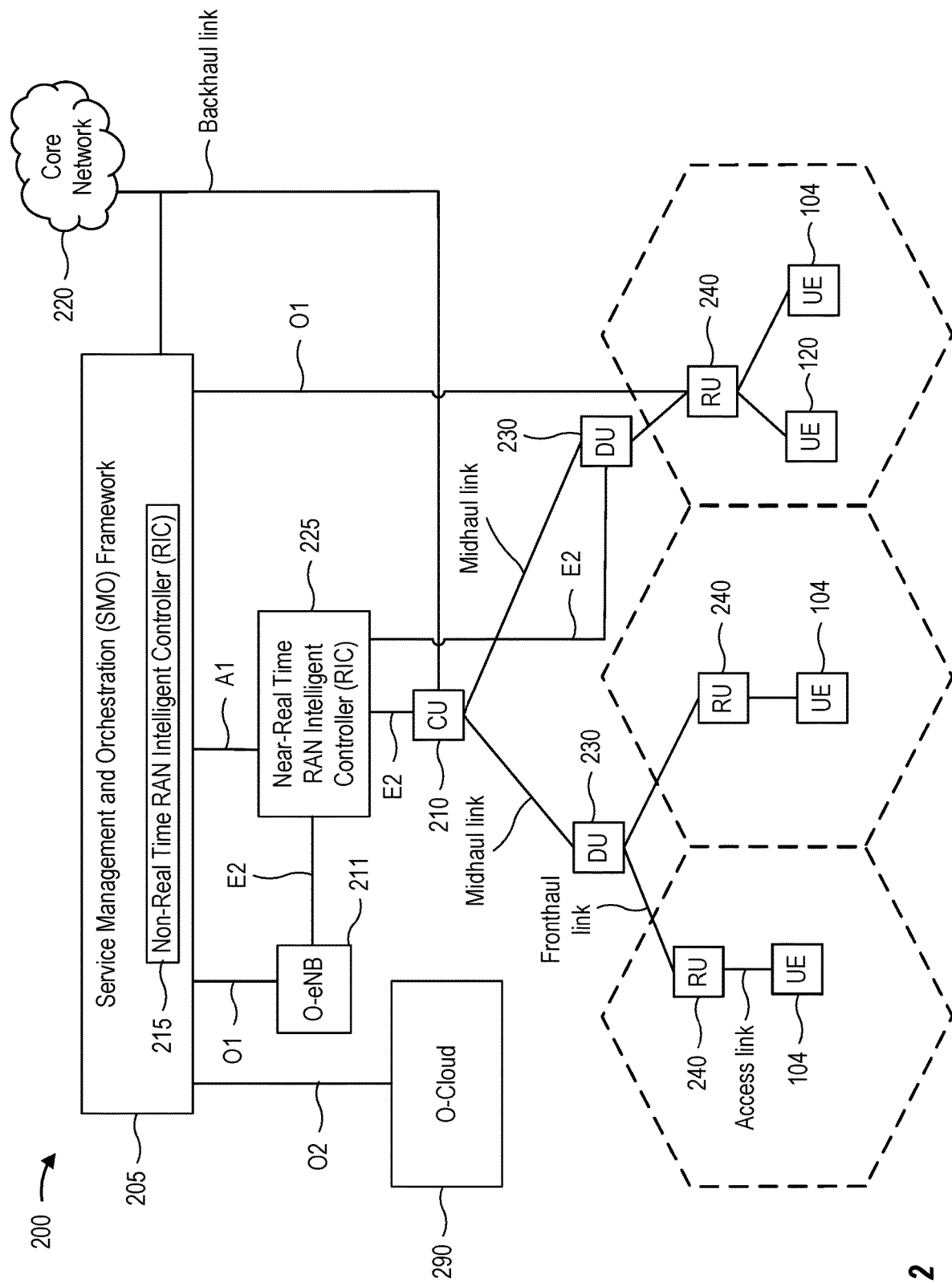
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
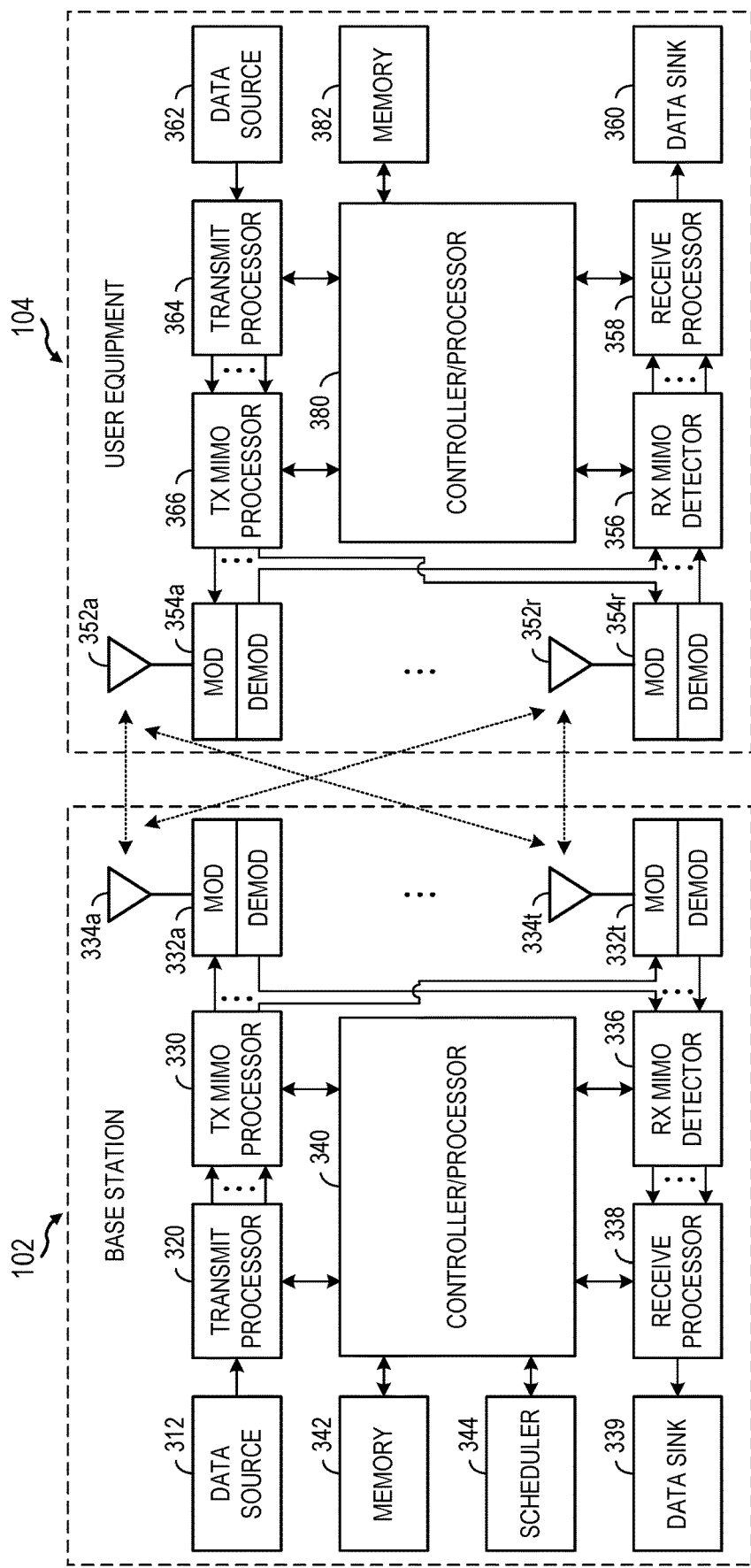
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Network Coding Scheme

Aspects of the present disclosure relate to wireless communications, and more particularly, to techniques for utilizing network coding for more efficient multicast transmission. As will be described in greater detail below, in some cases, a radio link layer (RLC) network coding sublayer may be used to increase efficiency and reliability while satisfying latency requirements.

Network coding generally refers to a technique where operations (e.g., algebraic algorithms), are performed on packets as they pass through nodes within a network. This is in contrast to traditional routing networks, where packets are simply cached and then forwarded to the next node downstream in the network. Network coding typically merges relevant messages at a node, using a given encoding, then forwards the accumulated result to a destination/receiver for decoding.

Figure 5A:
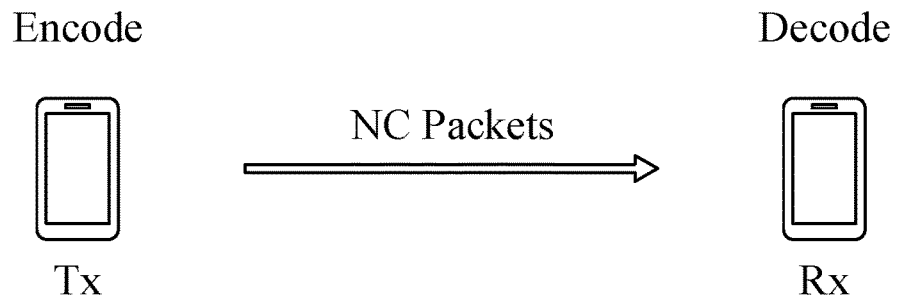
FIGS. 5A and 5B illustrate network coding (NC) examples.
Figure 5B:
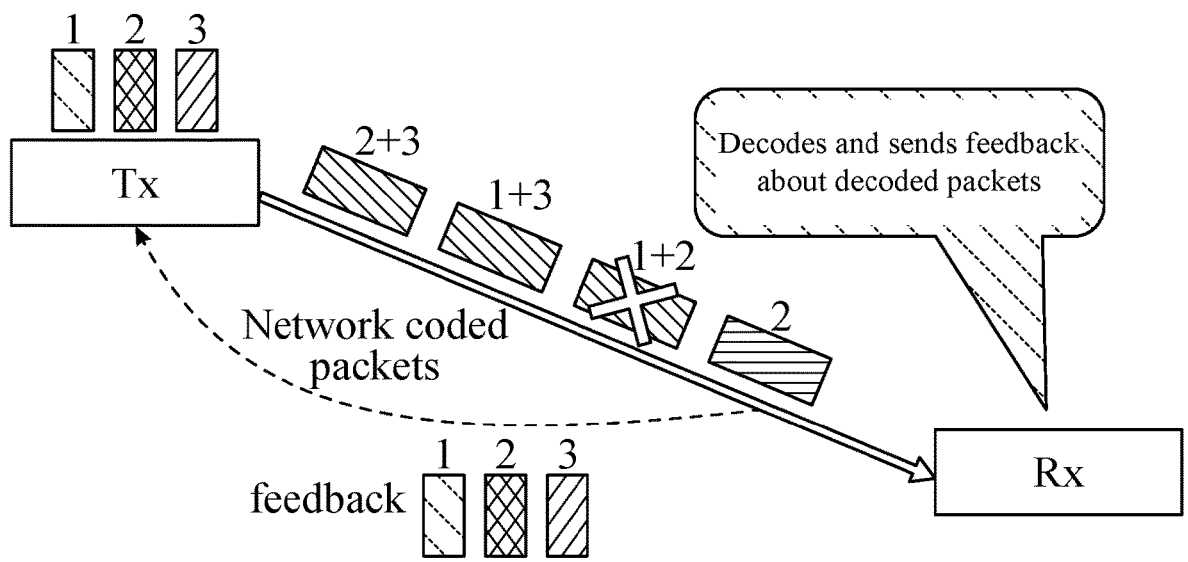

FIGS. 5A and 5B illustrate a simple single hop scenario utilizing NC. As shown in FIG. 5A, a transmitter device (Tx) generates and sends network coded packets to a receiver device (Rx). The transmitter device Tx (also referred to as a transmitter node, transmitter, encoder node, or encoder) and/or the receiver device Rx (also referred to as a receiver node, receiver, decoder node, or decoder) may be any type of UE, base station, an integrated access and backhaul (IAB) device, and/or the like.

As shown in FIG. 5B, the transmitter device Tx may generate the network coding packets from a set of original (or source) packets (e.g., packet 1 (p1), packet 2 (p2), and packet 3 (p3)). As illustrated, the network coding packets may be the same as a source packet or may include some combination of source packets (e.g., a linear combination of a subset of the source packets). Network coding may be performed using any type of network coding scheme, such as fountain coding, linear network coding, random linear network coding, Luby transform (LT) network coding, Raptor network coding, and/or the like.

The number of encoded packets is typically greater than the number of source packets, which provides redundancy and increases reliability. In the example illustrated in FIG. 3B, the transmitter device Tx encodes K original packets (e.g., K=3) into N network coded packets (e.g., N=4). As shown, the three source packets (p1, p2, and p3) are encoded into the four network coded packets: p2, p1+p2, p1+p3, and p2+p3.

The redundant information carried in the encoded packets may help the receiver device Rx recover the source packets even if not all of the network coded packets are successfully decoded. For example, assuming the receiver device Rx does not successfully decode network coded packet p1+p2 (as indicated by the X), the receiver device Rx may still be able to recover the source packets, as there is sufficient information in the other network coded packets (p2, p1+p3, and p2+p3). For example, the receiver device Rx may first decode network coded packet p2. Using the information for packet p2, the receiver may obtain packet p3 after decoding network coded packet p2+p3 (e.g., because the receiver has already decoded p2 and can use combining techniques to obtain p3 from p2+p3). In a similar manner, the receiver device Rx can obtain packet p1 from the network coded packet p1+p3 (because the receiver device Rx has already decoded packet p3 and can use combining to obtain packet p1 from network coded packet p1+p3).

As illustrated, in some cases, the receiver device Rx may provide feedback. In this example, the receiver device Rx indicates the three source packets (p1, p2, and p3) were successfully decoded. As will be described in greater detail below, such feedback may be used to update the network coded scheme.

Figure 6:
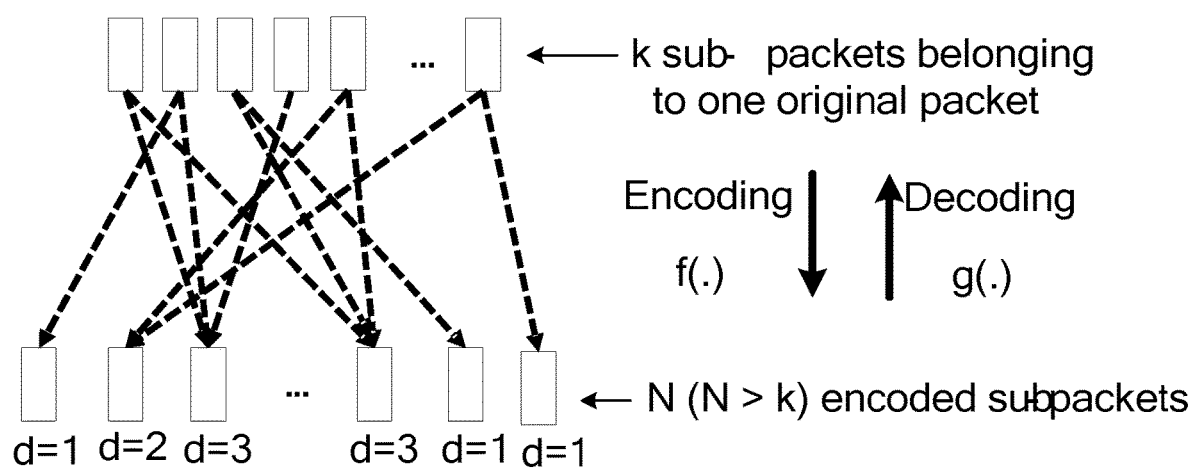
FIG. 6 illustrates an example of encoding and decoding for an NC scheme.

FIG. 6 illustrates details of encoding and decoding for an NC scheme. As illustrated, k sub-packets belonging to one original packet may be encoded to obtain N encoded sub-packets, where N>k and the values of N and k may be chosen to achieve sufficient redundancy to enhance reliability. From the N encoded sub-packets, a set of M sub-packets (where k≤M≤N) is expected to be decodable with a certain probability p. In other words, a receiver decoding M encoded sub-packets should expect to successfully recover the original packet with a probability of p. For some NC schemes, when M=k, probability p is 99% and increases as M increases (e.g., to 99.99% if M=k+1 or 99.9999% M=K+2).

Aspects Related to Network Coding with UE Cooperation

Aspects of the present disclosure, however, may utilize a cooperative UE to assist in delivering NC packets from a base station to a UE. A cooperative UE essentially provides multiple paths for the delivery of NC packets from a base station, which may help increase the likelihood NC packets are successfully received, using existing network infrastructure.

Figure 7:
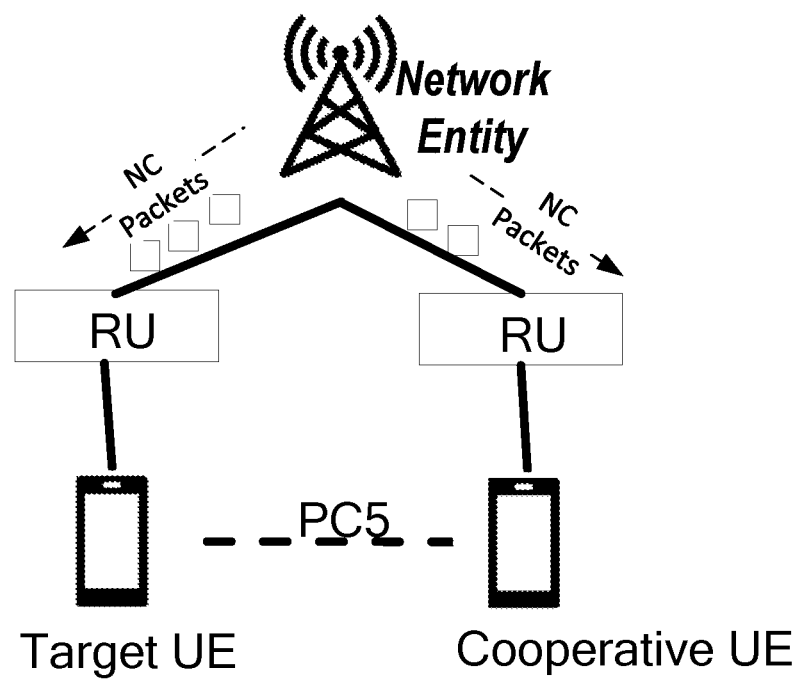
FIG. 7 depicts an example of wireless communication with assistance from a cooperative UE.

FIG. 7 illustrates an example of a deployment with a cooperative UE that may be used to deliver NC packets, in accordance with aspects of the present disclosure. As illustrated, a target UE may be connected to a network entity (e.g., to a remote unit of a gNB) via a Uu link. The target UE may also be connected to a cooperative UE on a sidelink, via a PC5 interface. As illustrated, the cooperative UE may be connected to the same gNB as the target UE.

As will be described in greater detail below, network coded (NC) packets may be transmitted directly from the gNB to the target UR over the Uu link and/or may be relayed via the cooperative UE. In so doing, aspects of the present disclosure may incorporate a network coding framework into the cellular protocol stack in order to achieve network coding operation with assistance from a cooperative UE.

As proposed herein, a target UE may receive, from a network entity, signaling configuring the target UE with at least one set of parameters for a network coding scheme. While connected to a cooperative UE via a sidelink, the target UE may receive network coded sub-packets from the network entity. Depending on a particular option, the target UE may receive network coded sub-packets or original sub-packets from the cooperative UE. The target UE may then decode the network coded sub-packets received from at least one of the network entity or the cooperative UE, based on the network coding scheme, to recover one or more original packets.

Figure 8:
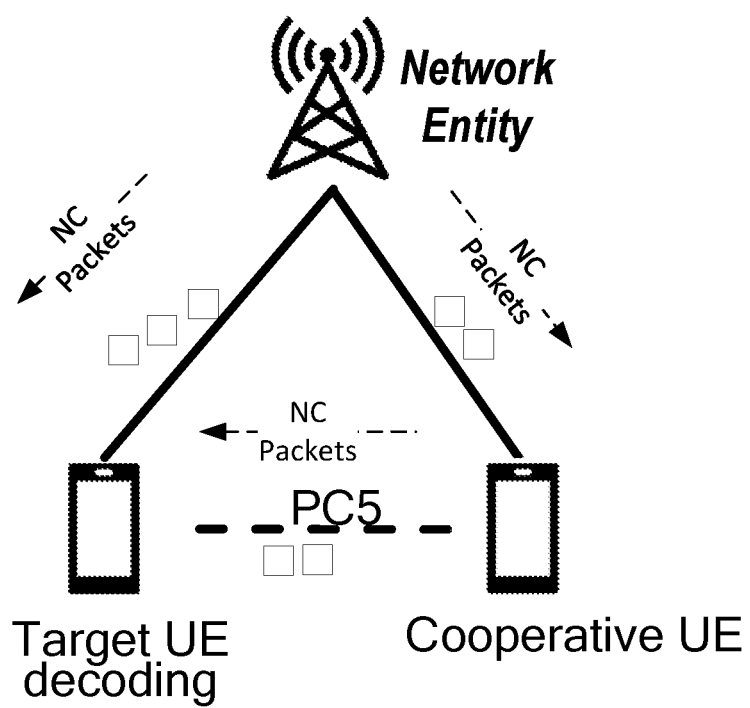
FIG. 8 depicts an example of a NC scheme with assistance from a cooperative UE.

FIG. 8 illustrates an example where a cooperative UE delivers NC packets to a target UE. As illustrated, in this case, the network entity (e.g., gNB) delivers a first set of NC packets to the target UE and the cooperative UE receives a second set of NC packets from the network entity and forwards them to target UE.

In this case, the gNB may configure the target UE with network coding related parameters. These parameters may include, for example, NC encoding/decoding algorithm and a size of decodable set M. The configuration may be provided via RRC signaling. In some cases, multiple sets of parameters may be configured and a configuration may be indicated via a medium access control (MAC) control element (CE) or downlink control information (DCI).

The gNB may also configure the target and cooperative UEs for cooperative communication on the sidelink. In some cases, the gNB may indicate a target UE and cooperative UE pair and, for that pair, a sidelink link communication resources, a sidelink beam pair, and resource allocation. In some cases, multiple target UE-cooperative UE pairs may be configured and one of the pairs may be indicated via a MAC CE or DCI (e.g., to switch UE pairs over the sidelink).

The target UE may be configured to indicate when network coded transmission should be terminated. For example, when the target UE successfully receives and decodes the original packets, the target UE may signal the gNB to stop network coding transmission. There are various options for the target UE to indicate when network coded transmission should be terminated.

Figure 9:
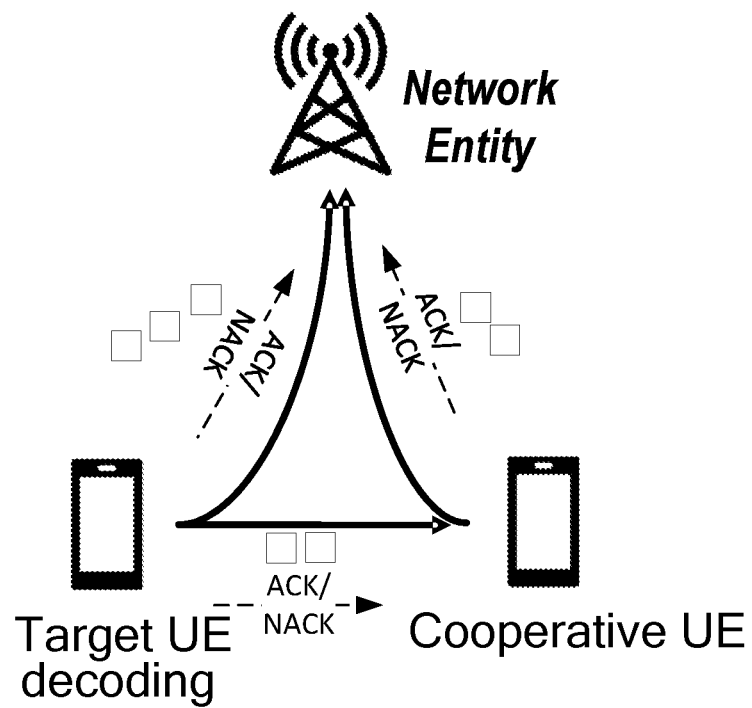
FIG. 9 depicts an example of providing feedback for a NC scheme with assistance from a cooperative UE.

FIG. 9 illustrates one option where the target UE may directly signal the gNB acknowledgment (ACK) feedback regarding successful decoding of original packets, for example, via MAC CE or uplink control information (UCI). In some cases, the feedback may indicate a specific ACK a last received network coding sub-packet from the gNB, indicating successful recovery of all original packets.

According to one option, the target UE may signal the cooperative UE regarding successful decoding of all original packets (e.g., via a sidelink MAC CE). In such cases, the cooperative UE may forward the successful decoding information to the gNB (e.g., via a MAC CE or UCI).

Figure 10:
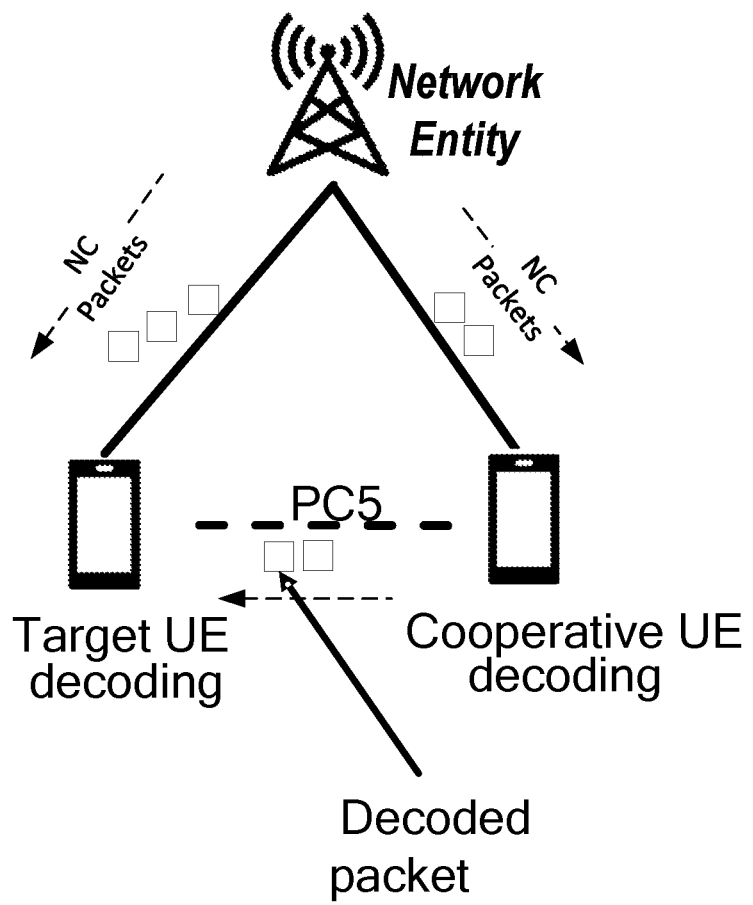
FIG. 10 depicts an example of a NC scheme with assistance from a cooperative UE.

FIG. 10 illustrates an example where a cooperative UE delivers decoded NC packets to a target UE. As illustrated, in this case, the gNB encodes part of the original packets and sends the corresponding (first set of) network coding encoded sub-packets to target UE. The gNB encodes remaining original packets and sends the corresponding (second set of) network coding encoded sub-packets to the cooperative UE. The cooperative UE decodes and recovers the original packets and forwards them to the target UE.

In this case, the gNB may configure both the target UE and the cooperative UE with network coding related parameters (to enable them both to decode the NC packets). These parameters may include, for example, NC encoding/decoding algorithm and a size of decodable set M. The configuration may be provided via RRC signaling. In some cases, multiple sets of parameters may be configured and a configuration may be indicated via MAC CE or DCI.

In this case, where the cooperative UE delivers decoded NC packets to the target UE, the target UE may directly signal the gNB ACK feedback regarding successful decoding of original packets, using the same mechanisms described above, with referend to FIG. 9.

In some cases, the target UE may receive signaling activating or deactivating network coding involving the cooperative UE. In some cases, such Activation/Deactivation signaling may be downlink-based. For example, the gNB may send signaling (e.g., via MAC CE or DCI) to activate/deactivate network coding with UE cooperation. In some cases, activation/deactivation signaling may be uplink-based. For example, the UE may request to activate/deactivate network coding with UE cooperation (e.g., via MAC CE or UCI. In some cases, RRC signaling may configure multiple options for network coding with UE cooperation. In such cases, the gNB or UE may signal which of the configured options is to be used in the activation signaling. In some cases, the gNB may also use MAC CE or DCI to switch network coding transmission configurations, if multiple options are available.

Using cooperative UEs to assist in delivering network coded packets, as described herein, may help achieve improved reliability, reduced latency, balanced system loading, and reduced power consumption.

Example Operations of a User Equipment

Figure 11:
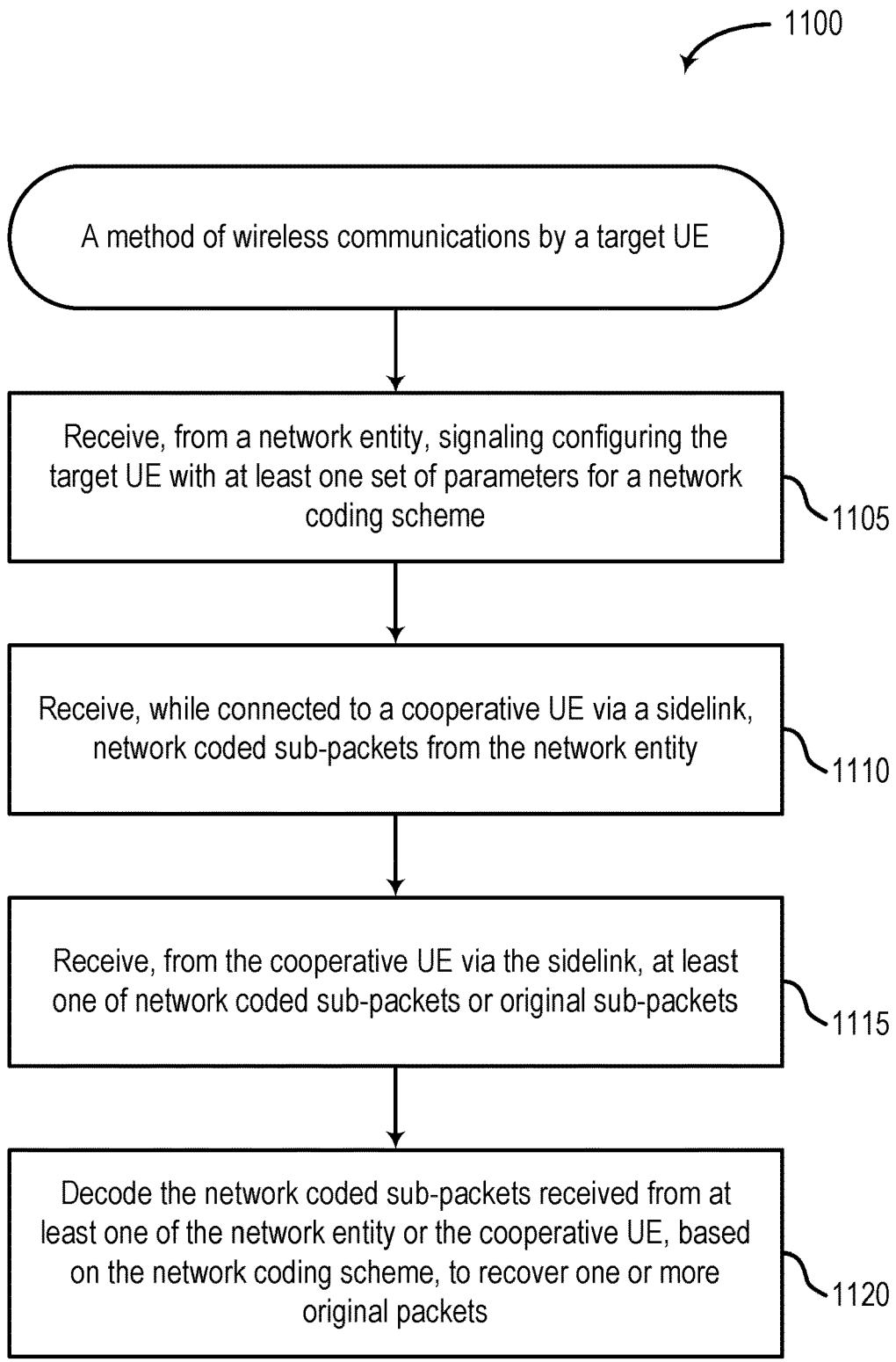
FIG. 11 depicts a method for wireless communications.

FIG. 11 shows an example of a method 1100 for wireless communications by a target UE, such as a UE 104 of FIGS. 1 and 3.

Method 1100 begins at step 1105 with receiving, from a network entity, signaling configuring the target UE with at least one set of parameters for a network coding scheme. In some cases, the operations of this step refer to, or may be performed by, circuitry for receiving and/or code for receiving as described with reference to FIG. 14.

Method 1100 then proceeds to step 1110 with receiving, while connected to a cooperative UE via a sidelink, network coded sub-packets from the network entity. In some cases, the operations of this step refer to, or may be performed by, circuitry for receiving and/or code for receiving as described with reference to FIG. 14.

Method 1100 then proceeds to step 1115 with receiving, from the cooperative UE via the sidelink, at least one of network coded sub-packets or original sub-packets. In some cases, the operations of this step refer to, or may be performed by, circuitry for receiving and/or code for receiving as described with reference to FIG. 14.

Method 1100 then proceeds to step 1120 with decoding the network coded sub-packets received from at least one of the network entity or the cooperative UE, based on the network coding scheme, to recover one or more original packets. In some cases, the operations of this step refer to, or may be performed by, circuitry for decoding and/or code for decoding as described with reference to FIG. 14.

In some aspects, the parameters for a network coding scheme comprise at least one of: a parameter indicating an encoding and decoding network coding algorithm; or a size of a decodable set of network coded sub-packets associated with a given probability of successful decoding of original packets.

In some aspects, the signaling comprises RRC signaling indicating multiple sets of parameters for the network coding scheme.

In some aspects, the method 1100 further includes receiving signaling, via DCI or a MAC-CE, selecting one of the multiple sets of parameters. In some cases, the operations of this step refer to, or may be performed by, circuitry for receiving and/or code for receiving as described with reference to FIG. 14.

In some aspects, the method 1100 further includes receiving signaling, from the network entity, configuring the target UE for cooperative communication on the sidelink. In some cases, the operations of this step refer to, or may be performed by, circuitry for receiving and/or code for receiving as described with reference to FIG. 14.

In some aspects, the signaling configuring the target UE for cooperative communication on the sidelink indicates at least one of: at least one target UE and cooperative UE pair; allocation of resources for sidelink communication; or a sidelink beam pair.

In some aspects, the signaling configuring the target UE for cooperative communication on the sidelink indicates multiple target UE and cooperative UE pairs.

In some aspects, the method 1100 further includes receiving signaling, via DCI or a MAC-CE, selecting one of the multiple target UE and cooperative UE pairs. In some cases, the operations of this step refer to, or may be performed by, circuitry for receiving and/or code for receiving as described with reference to FIG. 14.

In some aspects, receiving the network coded sub-packets from the network entity comprises receiving a first set of network coded sub-packets; and receiving, from the cooperative UE via the sidelink, at least one of network coded sub-packets or original sub-packets comprises receiving a second set of network coded sub-packets from the cooperative UE.

In some aspects, receiving the network coded sub-packets from the network entity comprises receiving a first set of network coded sub-packets, corresponding to a first set of original sub-packets, from the network entity; and receiving, from the cooperative UE via the sidelink, at least one of network coded sub-packets or original sub-packets comprises receiving a first set of original sub-packets.

In some aspects, the method 1100 further includes providing feedback to the network entity regarding successful decoding of original packets. In some cases, the operations of this step refer to, or may be performed by, circuitry for providing and/or code for providing as described with reference to FIG. 14.

In some aspects, the feedback is provided via at least one of UCI or a MAC-CE.

In some aspects, the feedback indicates: a last received network coded sub-packet from the network entity; or successful recovery of original packets from the network coded sub-packets.

In some aspects, the method 1100 further includes providing feedback to the cooperative UE regarding successful decoding of original packets. In some cases, the operations of this step refer to, or may be performed by, circuitry for providing and/or code for providing as described with reference to FIG. 14.

In some aspects, the feedback is provided via a sidelink MAC-CE.

In some aspects, the method 1100 further includes receiving signaling activating or deactivating network coding involving the cooperative UE. In some cases, the operations of this step refer to, or may be performed by, circuitry for receiving and/or code for receiving as described with reference to FIG. 14.

In some aspects, the signaling configuring the target UE with at least one set of parameters for a network coding scheme comprises the UE with multiple sets of parameters for the network coding scheme; and the signaling activating or deactivating network coding involving the cooperative UE indicates at least one of the multiple sets of parameters for the network coding scheme to activate or deactivate.

In some aspects, the method 1100 further includes transmitting signaling, to the network entity, requesting activation or deactivation of network coding involving the cooperative UE. In some cases, the operations of this step refer to, or may be performed by, circuitry for transmitting and/or code for transmitting as described with reference to FIG. 14.

In some aspects, the signaling configuring the target UE with at least one set of parameters for a network coding scheme comprises the UE with multiple sets of parameters for the network coding scheme; and the signaling requesting activation or deactivation of network coding involving the cooperative UE indicates at least one of the multiple sets of parameters for the network coding scheme to activate or deactivate.

In some aspects, the method 1100 further includes transmitting signaling, to the network entity indicating capability of the target UE for supporting the network coding scheme. In some cases, the operations of this step refer to, or may be performed by, circuitry for transmitting and/or code for transmitting as described with reference to FIG. 14.

In some aspects, the signaling transmitted to the network entity also indicates one or more triggering factors for at least one of activating or deactivating the network coding scheme.

Figure 14:
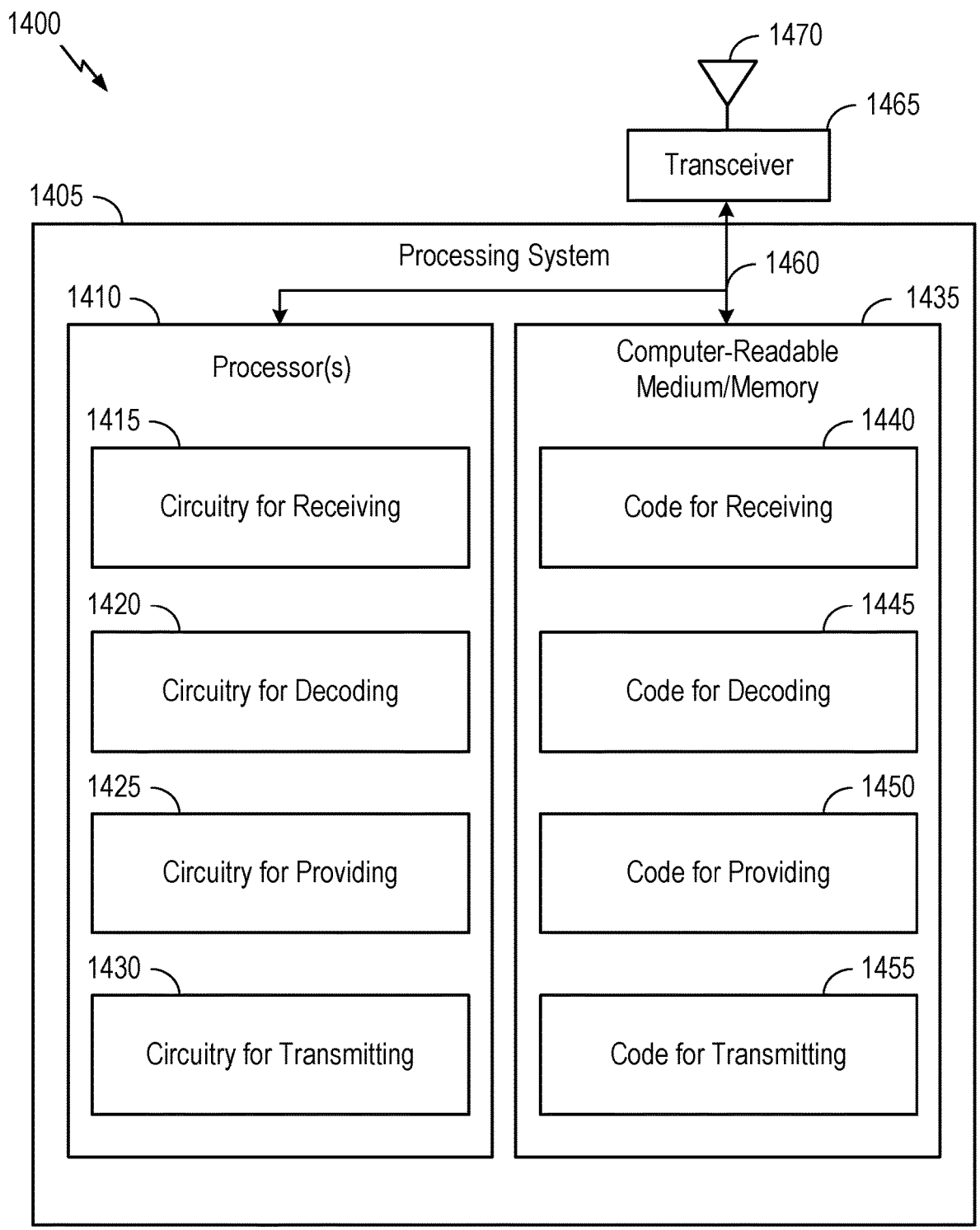
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Figure 12:
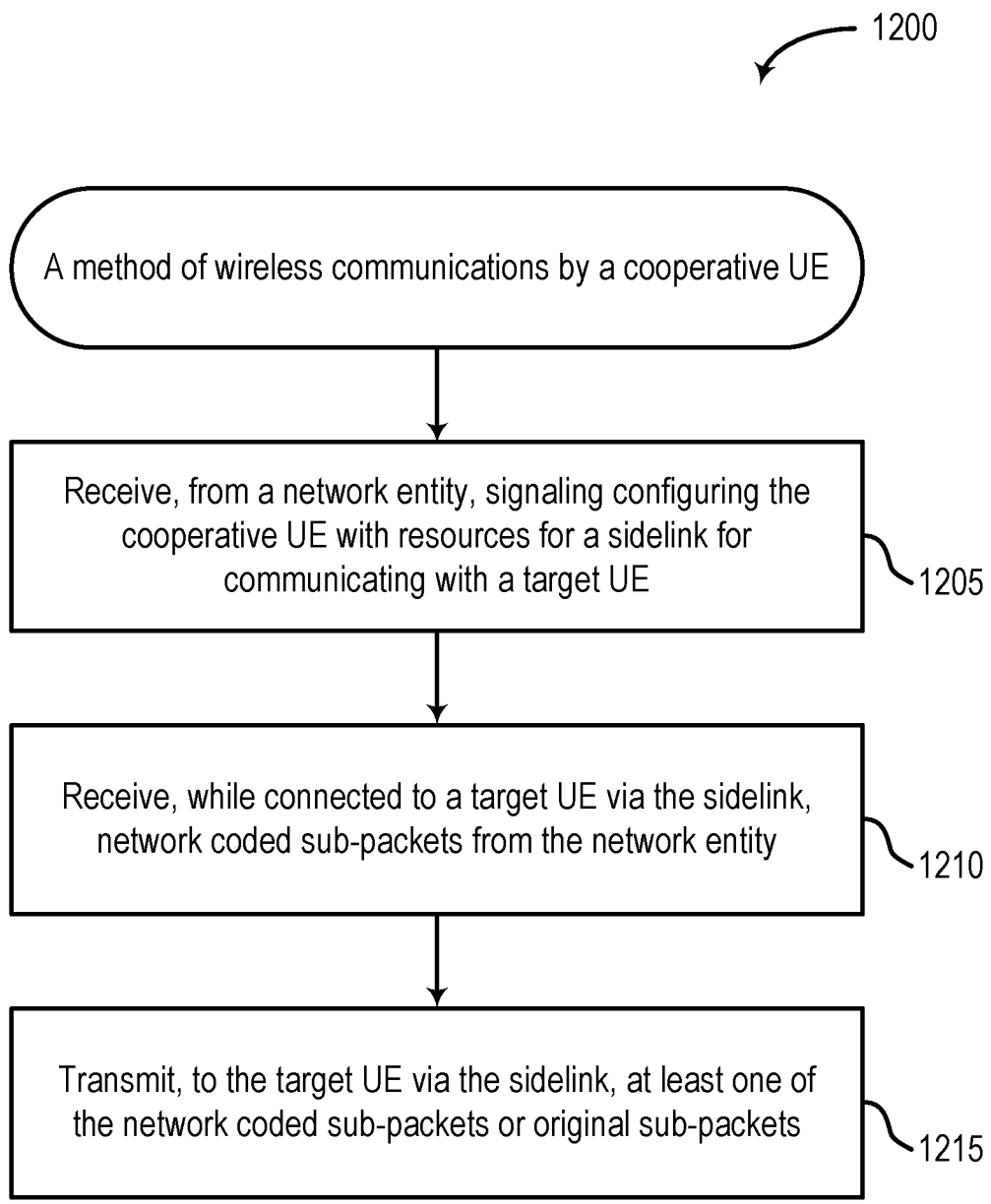
FIG. 12 depicts a method for wireless communications.

FIG. 12 shows an example of a method 1200 for wireless communications by a cooperative UE, such as a UE 104 of FIGS. 1 and 3.

Method 1200 begins at step 1205 with receiving, from a network entity, signaling configuring the cooperative UE with resources for a sidelink for communicating with a target UE. In some cases, the operations of this step refer to, or may be performed by, circuitry for receiving and/or code for receiving as described with reference to FIG. 15.

Method 1200 then proceeds to step 1210 with receiving, while connected to a target UE via the sidelink, network coded sub-packets from the network entity. In some cases, the operations of this step refer to, or may be performed by, circuitry for receiving and/or code for receiving as described with reference to FIG. 15.

Method 1200 then proceeds to step 1215 with transmitting, to the target UE via the sidelink, at least one of the network coded sub-packets or original sub-packets. In some cases, the operations of this step refer to, or may be performed by, circuitry for transmitting and/or code for transmitting as described with reference to FIG. 15.

In some aspects, receiving the network coded sub-packets from the network entity comprises receiving a first set of network coded sub-packets; and receiving, from the cooperative UE via the sidelink, at least one of network coded sub-packets or original sub-packets comprises receiving a second set of network coded sub-packets from the cooperative UE.

In some aspects, the method 1200 further includes receiving signaling configuring the cooperative UE with at least one set of parameters for a network coding scheme. In some cases, the operations of this step refer to, or may be performed by, circuitry for receiving and/or code for receiving as described with reference to FIG. 15.

In some aspects, the method 1200 further includes decoding the network coded sub-packets, received from the network entity, based on the parameters for the network coding scheme to recover original sub-packets. In some cases, the operations of this step refer to, or may be performed by, circuitry for decoding and/or code for decoding as described with reference to FIG. 15.

In some aspects, transmitting, to the target UE via the sidelink, at least one of the network coded sub-packets or original sub-packets comprises: transmitting, to the target UE via the sidelink, the recovered original sub-packets.

In some aspects, the parameters for a network coding scheme comprise at least one of: a parameter indicating an encoding and decoding network coding algorithm; or a size of a decodable set of network coded sub-packets associated with a given probability of successful decoding of original packets.

In some aspects, the signaling comprises RRC signaling indicating multiple sets of parameters for the network coding scheme.

In some aspects, the method 1200 further includes receiving signaling, via DCI or a MAC-CE, selecting one of the multiple sets of parameters. In some cases, the operations of this step refer to, or may be performed by, circuitry for receiving and/or code for receiving as described with reference to FIG. 15.

In some aspects, the signaling configuring the cooperative UE with resources for a sidelink for communicating with a target UE indicates at least one of: at least one target UE and cooperative UE pair; allocation of resources for sidelink communication; or a sidelink beam pair.

In some aspects, the signaling configuring the target UE for cooperative communication on the sidelink indicates multiple target UE and cooperative UE pairs.

In some aspects, the method 1200 further includes receiving signaling, via DCI or a MAC-CE, selecting one of the multiple target UE and cooperative UE pairs. In some cases, the operations of this step refer to, or may be performed by, circuitry for receiving and/or code for receiving as described with reference to FIG. 15.

In some aspects, the method 1200 further includes receiving, from the target UE, feedback regarding successful decoding of original packets by the target UE. In some cases, the operations of this step refer to, or may be performed by, circuitry for receiving and/or code for receiving as described with reference to FIG. 15.

In some aspects, the method 1200 further includes transmitting the feedback to the network entity. In some cases, the operations of this step refer to, or may be performed by, circuitry for transmitting and/or code for transmitting as described with reference to FIG. 15.

In some aspects, the method 1200 further includes receiving signaling activating or deactivating network coding involving the target UE. In some cases, the operations of this step refer to, or may be performed by, circuitry for receiving and/or code for receiving as described with reference to FIG. 15.

In some aspects, the signaling configuring the target UE with at least one set of parameters for a network coding scheme comprises the UE with multiple sets of parameters for the network coding scheme; and the signaling activating or deactivating network coding involving the target UE indicates at least one of the multiple sets of parameters for the network coding scheme to activate or deactivate.

In some aspects, the method 1200 further includes transmitting signaling, to the network entity indicating capability of the cooperative UE for supporting the network coding scheme. In some cases, the operations of this step refer to, or may be performed by, circuitry for transmitting and/or code for transmitting as described with reference to FIG. 15.

Figure 15:
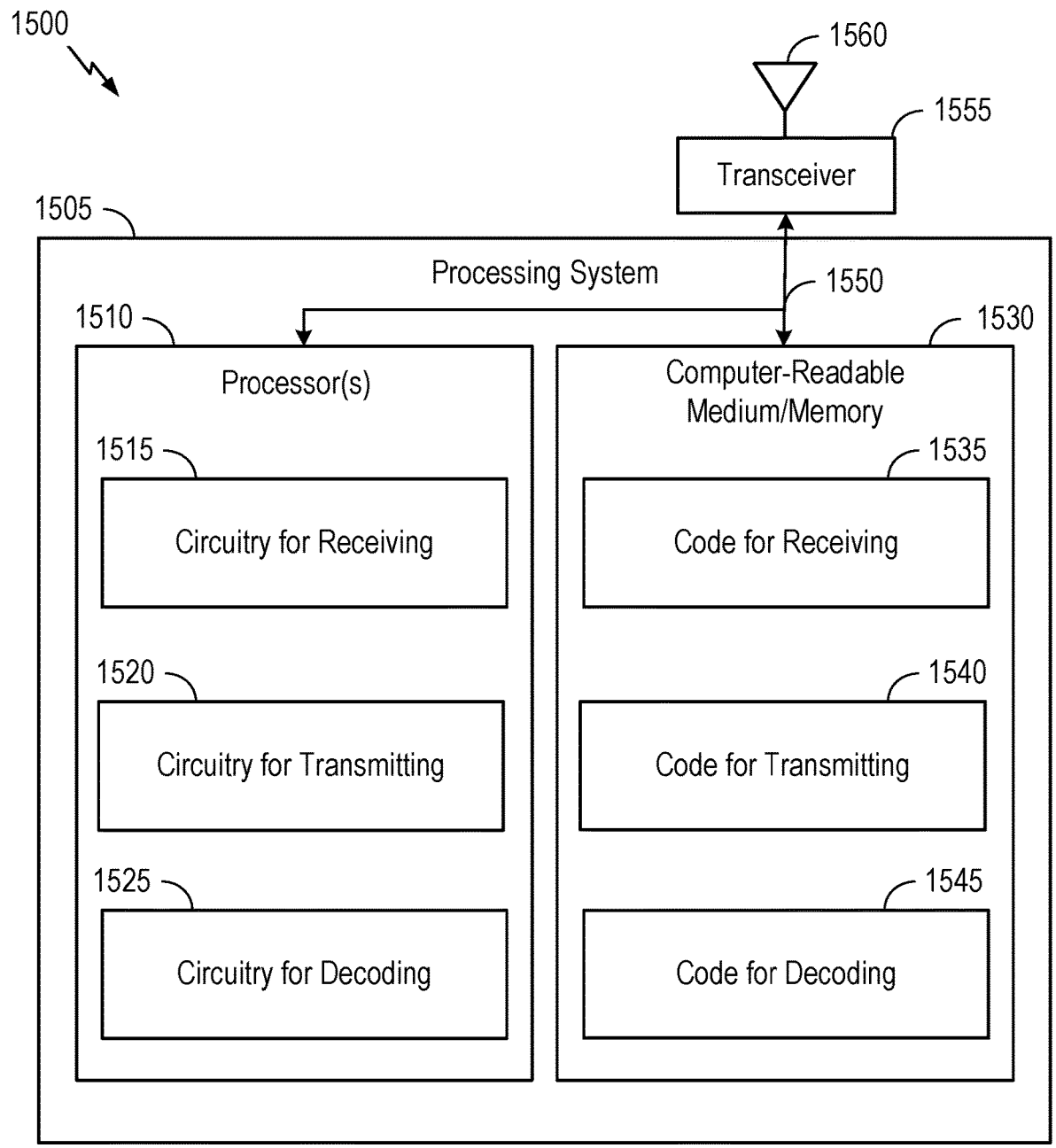
FIG. 15 depicts aspects of an example communications device.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Example Operations of a Network Entity

Figure 13:
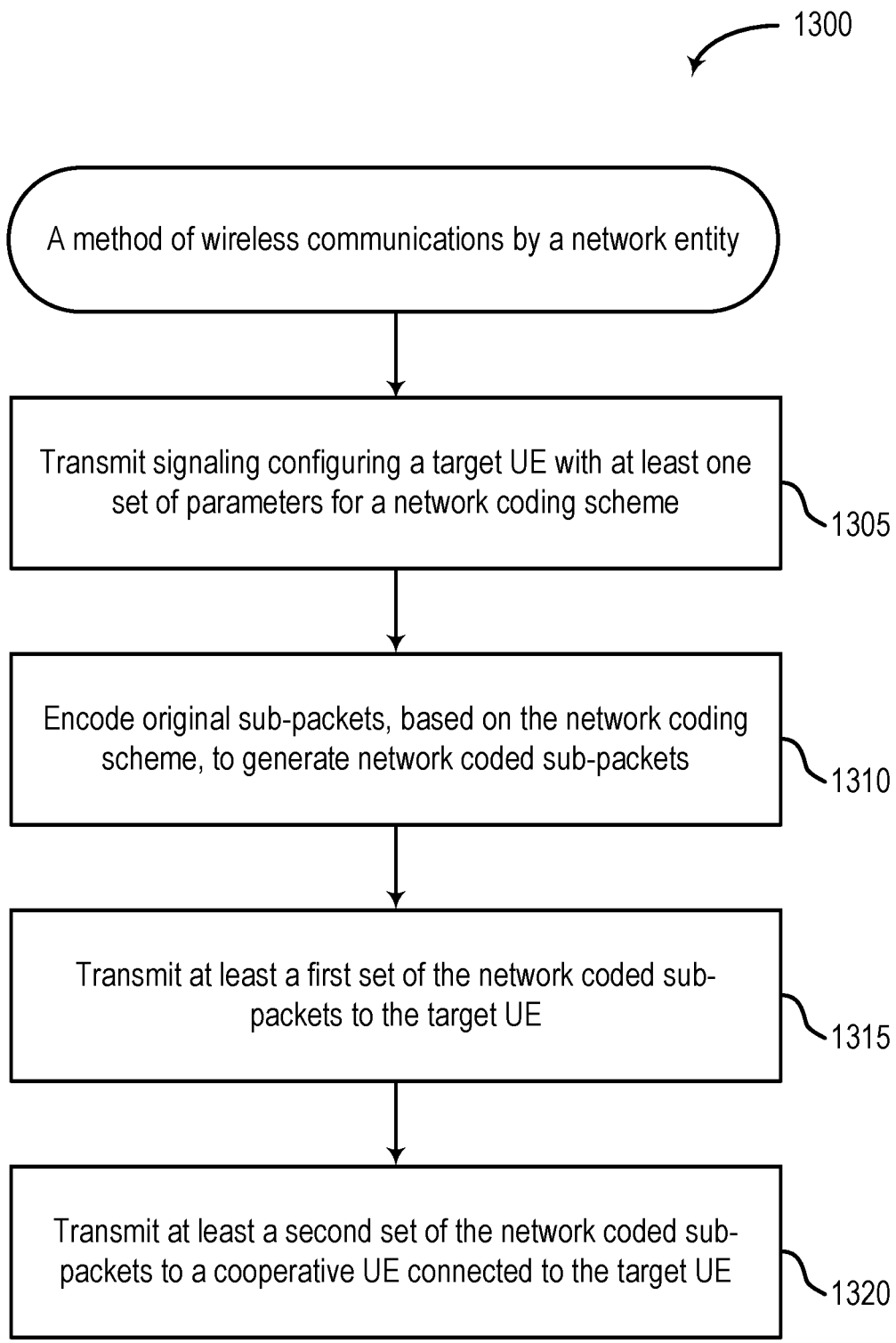
FIG. 13 depicts a method for wireless communications.

FIG. 13 shows an example of a method 1300 for wireless communications by a network entity, such as BS 102 of FIGS. 1 and 3, or a disaggregated base station as discussed with respect to FIG. 2.

Method 1300 begins at step 1305 with transmitting signaling configuring a target UE with at least one set of parameters for a network coding scheme. In some cases, the operations of this step refer to, or may be performed by, circuitry for transmitting and/or code for transmitting as described with reference to FIG. 16.

Method 1300 then proceeds to step 1310 with encoding original sub-packets, based on the network coding scheme, to generate network coded sub-packets. In some cases, the operations of this step refer to, or may be performed by, circuitry for encoding and/or code for encoding as described with reference to FIG. 16.

Method 1300 then proceeds to step 1315 with transmitting at least a first set of the network coded sub-packets to the target UE. In some cases, the operations of this step refer to, or may be performed by, circuitry for transmitting and/or code for transmitting as described with reference to FIG. 16.

Method 1300 then proceeds to step 1320 with transmitting at least a second set of the network coded sub-packets to a cooperative UE connected to the target UE. In some cases, the operations of this step refer to, or may be performed by, circuitry for transmitting and/or code for transmitting as described with reference to FIG. 16.

In some aspects, the parameters for a network coding scheme comprise at least one of: a parameter indicating an encoding and decoding network coding algorithm; or a size of a decodable set of network coded sub-packets associated with a given probability of successful decoding of original packets.

In some aspects, the signaling comprises RRC signaling indicating multiple sets of parameters for the network coding scheme.

In some aspects, the method 1300 further includes transmitting signaling, via DCI or a MAC-CE, selecting one of the multiple sets of parameters. In some cases, the operations of this step refer to, or may be performed by, circuitry for transmitting and/or code for transmitting as described with reference to FIG. 16.

In some aspects, the method 1300 further includes transmitting signaling configuring the target UE for cooperative communication on the sidelink. In some cases, the operations of this step refer to, or may be performed by, circuitry for transmitting and/or code for transmitting as described with reference to FIG. 16.

In some aspects, the signaling configuring the target UE for cooperative communication on the sidelink indicates at least one of: at least one target UE and cooperative UE pair; allocation of resources for sidelink communication; or a sidelink beam pair.

In some aspects, the signaling configuring the target UE for cooperative communication on the sidelink indicates multiple target UE and cooperative UE pairs.

In some aspects, the method 1300 further includes transmitting signaling, via DCI or a MAC-CE, selecting one of the multiple target UE and cooperative UE pairs. In some cases, the operations of this step refer to, or may be performed by, circuitry for transmitting and/or code for transmitting as described with reference to FIG. 16.

In some aspects, the method 1300 further includes transmitting signaling configuring the cooperative UE to forward the second set of network coded sub-packets to the target UE. In some cases, the operations of this step refer to, or may be performed by, circuitry for transmitting and/or code for transmitting as described with reference to FIG. 16.

In some aspects, the method 1300 further includes transmitting signaling configuring the cooperative UE to decode the second set of network coded sub-packets to recover original sub-packets and to forward the recovered original sub-packets to the target UE. In some cases, the operations of this step refer to, or may be performed by, circuitry for transmitting and/or code for transmitting as described with reference to FIG. 16.

In some aspects, the method 1300 further includes receiving feedback regarding successful decoding of original packets. In some cases, the operations of this step refer to, or may be performed by, circuitry for receiving and/or code for receiving as described with reference to FIG. 16.

In some aspects, the feedback is received via at least one of UCI or a MAC-CE.

In some aspects, the feedback indicates: a last received network coded sub-packet from the network entity; or successful recovery of original packets from the network coded sub-packets.

In some aspects, the method 1300 further includes receiving feedback, via the cooperative UE, regarding successful decoding of original packets. In some cases, the operations of this step refer to, or may be performed by, circuitry for receiving and/or code for receiving as described with reference to FIG. 16.

In some aspects, the method 1300 further includes transmitting signaling activating or deactivating network coding involving the cooperative UE. In some cases, the operations of this step refer to, or may be performed by, circuitry for transmitting and/or code for transmitting as described with reference to FIG. 16.

In some aspects, the signaling configuring the target UE with at least one set of parameters for a network coding scheme comprises the UE with multiple sets of parameters for the network coding scheme; and the signaling activating or deactivating network coding involving the cooperative UE indicates at least one of the multiple sets of parameters for the network coding scheme to activate or deactivate.

In some aspects, the method 1300 further includes receiving signaling requesting activation or deactivation of network coding involving the cooperative UE. In some cases, the operations of this step refer to, or may be performed by, circuitry for receiving and/or code for receiving as described with reference to FIG. 16.

In some aspects, the signaling configuring the target UE with at least one set of parameters for a network coding scheme comprises the UE with multiple sets of parameters for the network coding scheme; and the signaling requesting activation or deactivation of network coding involving the cooperative UE indicates at least one of the multiple sets of parameters for the network coding scheme to activate or deactivate.

In some aspects, the method 1300 further includes receiving signaling indicating capability of the target UE for supporting the network coding scheme. In some cases, the operations of this step refer to, or may be performed by, circuitry for receiving and/or code for receiving as described with reference to FIG. 16.

In some aspects, the signaling also indicates one or more triggering factors for at least one of activating or deactivating the network coding scheme.

Figure 16:
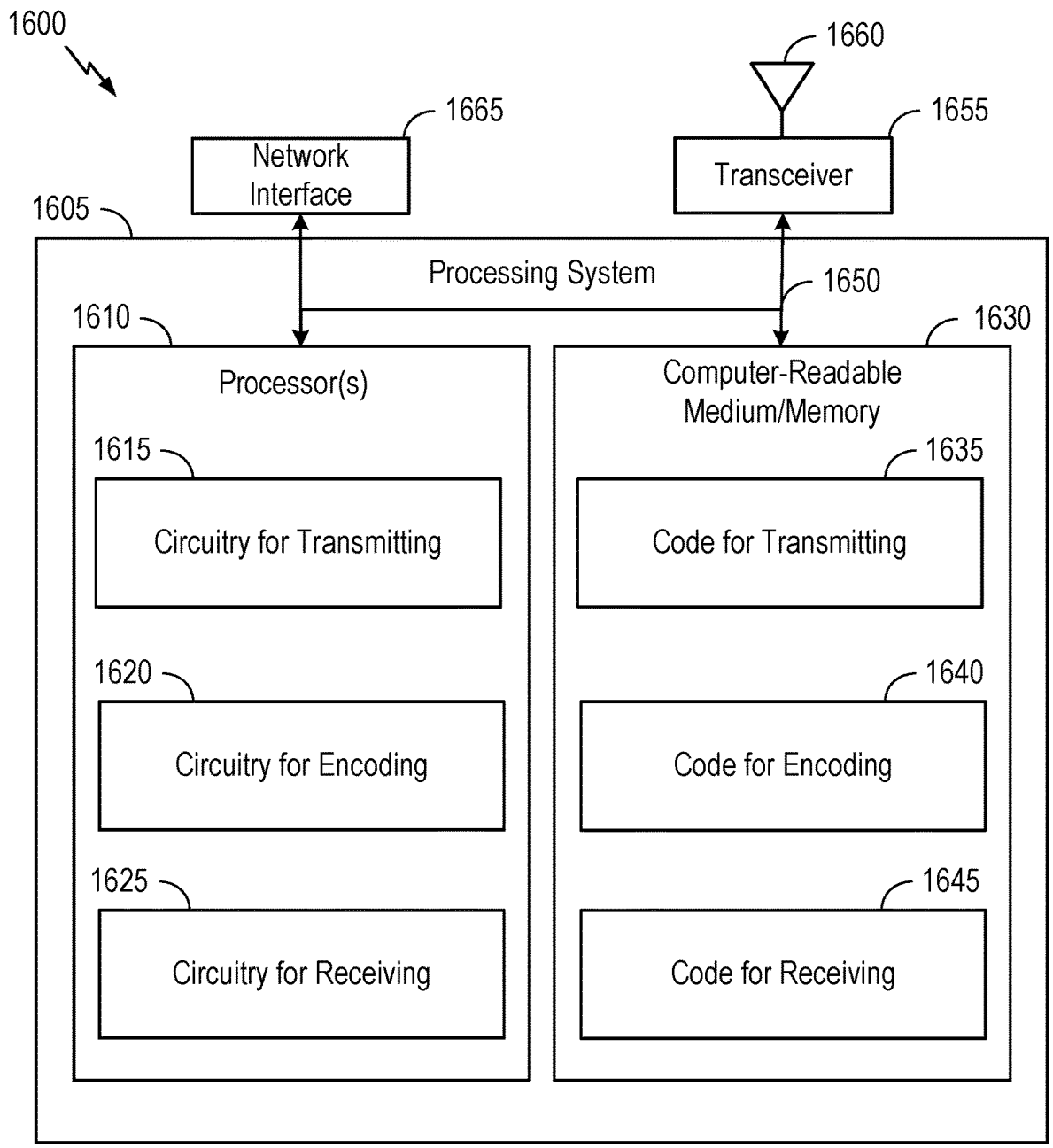
FIG. 16 depicts aspects of an example communications device.

In one aspect, method 1300, or any aspect related to it, may be performed by an apparatus, such as communications device 1600 of FIG. 16, which includes various components operable, configured, or adapted to perform the method 1300. Communications device 1600 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a user equipment, such as UE 104 described above with respect to FIGS. 1 and 3.

The communications device 1400 includes a processing system 1405 coupled to the transceiver 1465 (e.g., a transmitter and/or a receiver). The transceiver 1465 is configured to transmit and receive signals for the communications device 1400 via the antenna 1470, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1100 described with respect to FIG. 11, or any aspect related to it. Note that reference to a processor performing a function of communications device 1400 may include one or more processors 1410 performing that function of communications device 1400.

In the depicted example, computer-readable medium/memory 1435 stores code (e.g., executable instructions), such as code for receiving 1440, code for decoding 1445, code for providing 1450, and code for transmitting 1455. Processing of the code for receiving 1440, code for decoding 1445, code for providing 1450, and code for transmitting 1455 may cause the communications device 1400 to perform the method 1100 described with respect to FIG. 11, or any aspect related to it.

The one or more processors 1410 include circuitry configured to implement (e.g., execute) the code stored in the computer-readable medium/memory 1435, including circuitry such as circuitry for receiving 1415, circuitry for decoding 1420, circuitry for providing 1425, and circuitry for transmitting 1430. Processing with circuitry for receiving 1415, circuitry for decoding 1420, circuitry for providing 1425, and circuitry for transmitting 1430 may cause the communications device 1400 to perform the method 1100 described with respect to FIG. 11, or any aspect related to it.

Various components of the communications device 1400 may provide means for performing the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1465 and the antenna 1470 of the communications device 1400 in FIG. 14. Means for receiving or obtaining may include transceivers 354 and/or antenna(s) 352 of the UE 104 illustrated in FIG. 3 and/or the transceiver 1465 and the antenna 1470 of the communications device 1400 in FIG. 14.

FIG. 15 depicts aspects of an example communications device 1500. In some aspects, communications device 1500 is a user equipment, such as UE 104 described above with respect to FIGS. 1 and 3.

The communications device 1500 includes a processing system 1505 coupled to the transceiver 1555 (e.g., a transmitter and/or a receiver). The transceiver 1555 is configured to transmit and receive signals for the communications device 1500 via the antenna 1560, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1200 described with respect to FIG. 12, or any aspect related to it. Note that reference to a processor performing a function of communications device 1500 may include one or more processors 1510 performing that function of communications device 1500.

In the depicted example, computer-readable medium/memory 1530 stores code (e.g., executable instructions), such as code for receiving 1535, code for transmitting 1540, and code for decoding 1545. Processing of the code for receiving 1535, code for transmitting 1540, and code for decoding 1545 may cause the communications device 1500 to perform the method 1200 described with respect to FIG. 12, or any aspect related to it.

The one or more processors 1510 include circuitry configured to implement (e.g., execute) the code stored in the computer-readable medium/memory 1530, including circuitry such as circuitry for receiving 1515, circuitry for transmitting 1520, and circuitry for decoding 1525. Processing with circuitry for receiving 1515, circuitry for transmitting 1520, and circuitry for decoding 1525 may cause the communications device 1500 to perform the method 1200 described with respect to FIG. 12, or any aspect related to it.

Various components of the communications device 1500 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1555 and the antenna 1560 of the communications device 1500 in FIG. Means for receiving or obtaining may include transceivers 354 and/or antenna(s) 352 of the UE 104 illustrated in FIG. 3 and/or the transceiver 1555 and the antenna 1560 of the communications device 1500 in FIG. 15.

FIG. 16 depicts aspects of an example communications device 1600. In some aspects, communications device 1600 is a network entity, such as BS 102 of FIGS. 1 and 3, or a disaggregated base station as discussed with respect to FIG. 2.

The communications device 1600 includes a processing system 1605 coupled to the transceiver 1655 (e.g., a transmitter and/or a receiver) and/or a network interface 1665. The transceiver 1655 is configured to transmit and receive signals for the communications device 1600 via the antenna 1660, such as the various signals as described herein. The network interface 1665 is configured to obtain and send signals for the communications device 1600 via communication link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1630 via a bus 1650. In certain aspects, the computer-readable medium/memory 1630 is configured to store instructions (e.g., computer-executable code) that when executed by the one or more processors 1610, cause the one or more processors 1610 to perform the method 1300 described with respect to FIG. 13, or any aspect related to it. Note that reference to a processor of communications device 1600 performing a function may include one or more processors 1610 of communications device 1600 performing that function.

In the depicted example, the computer-readable medium/memory 1630 stores code (e.g., executable instructions), such as code for transmitting 1635, code for encoding 1640, and code for receiving 1645. Processing of the code for transmitting 1635, code for encoding 1640, and code for receiving 1645 may cause the communications device 1600 to perform the method 1300 described with respect to FIG. 13, or any aspect related to it.

The one or more processors 1610 include circuitry configured to implement (e.g., execute) the code stored in the computer-readable medium/memory 1630, including circuitry such as circuitry for transmitting 1615, circuitry for encoding 1620, and circuitry for receiving 1625. Processing with circuitry for transmitting 1615, circuitry for encoding 1620, and circuitry for receiving 1625 may cause the communications device 1600 to perform the method 1300 as described with respect to FIG. 13, or any aspect related to it.

Various components of the communications device 1600 may provide means for performing the method 1300 as described with respect to FIG. 13, or any aspect related to it. Means for transmitting, sending or outputting for transmission may include transceivers 332 and/or antenna(s) 334 of the BS 102 illustrated in FIG. 3 and/or the transceiver 1655 and the antenna 1660 of the communications device 1600 in FIG. 16. Means for receiving or obtaining may include transceivers 332 and/or antenna(s) 334 of the BS 102 illustrated in FIG. 3 and/or the transceiver 1655 and the antenna 1660 of the communications device 1600 in FIG. 16.

Example Clauses

Implementation examples are described in the following numbered clauses:

Clause 1: A method of wireless communication by a target UE, comprising: receiving, from a network entity, signaling configuring the target UE with at least one set of parameters for a network coding scheme; receiving, while connected to a cooperative UE via a sidelink, network coded sub-packets from the network entity; receiving, from the cooperative UE via the sidelink, at least one of network coded sub-packets or original sub-packets; and decoding the network coded sub-packets received from at least one of the network entity or the cooperative UE, based on the network coding scheme, to recover one or more original packets.

Clause 2: The method of Clause 1, wherein the parameters for a network coding scheme comprise at least one of: a parameter indicating an encoding and decoding network coding algorithm; or a size of a decodable set of network coded sub-packets associated with a given probability of successful decoding of original packets.

Clause 3: The method of any one of Clauses 1 and 2, wherein the signaling comprises RRC signaling indicating multiple sets of parameters for the network coding scheme.

Clause 4: The method of Clause 3, further comprising: receiving signaling, via DCI or a MAC-CE, selecting one of the multiple sets of parameters.

Clause 5: The method of any one of Clauses 1-4, further comprising: receiving signaling, from the network entity, configuring the target UE for cooperative communication on the sidelink.

Clause 6: The method of Clause 5, wherein the signaling configuring the target UE for cooperative communication on the sidelink indicates at least one of: at least one target UE and cooperative UE pair; allocation of resources for sidelink communication; or a sidelink beam pair.

Clause 7: The method of Clause 6, wherein the signaling configuring the target UE for cooperative communication on the sidelink indicates multiple target UE and cooperative UE pairs.

Clause 8: The method of Clause 7, further comprising: receiving signaling, via DCI or a MAC-CE, selecting one of the multiple target UE and cooperative UE pairs.

Clause 9: The method of any one of Clauses 1-8, wherein: receiving the network coded sub-packets from the network entity comprises receiving a first set of network coded sub-packets; and receiving, from the cooperative UE via the sidelink, at least one of network coded sub-packets or original sub-packets comprises receiving a second set of network coded sub-packets from the cooperative UE.

Clause 10: The method of any one of Clauses 1-9, wherein: receiving the network coded sub-packets from the network entity comprises receiving a first set of network coded sub-packets, corresponding to a first set of original sub-packets, from the network entity; and receiving, from the cooperative UE via the sidelink, at least one of network coded sub-packets or original sub-packets comprises receiving a first set of original sub-packets.

Clause 11: The method of any one of Clauses 1-10, further comprising: providing feedback to the network entity regarding successful decoding of original packets.

Clause 12: The method of Clause 11, wherein the feedback is provided via at least one of UCI or a MAC-CE.

Clause 13: The method of Clause 11, wherein the feedback indicates: a last received network coded sub-packet from the network entity; or successful recovery of original packets from the network coded sub-packets.

Clause 14: The method of any one of Clauses 1-13, further comprising: providing feedback to the cooperative UE regarding successful decoding of original packets.

Clause 15: The method of Clause 14, wherein the feedback is provided via a sidelink MAC-CE.

Clause 16: The method of any one of Clauses 1-15, further comprising: receiving signaling activating or deactivating network coding involving the cooperative UE.

Clause 17: The method of Clause 16, wherein: the signaling configuring the target UE with at least one set of parameters for a network coding scheme comprises the UE with multiple sets of parameters for the network coding scheme; and the signaling activating or deactivating network coding involving the cooperative UE indicates at least one of the multiple sets of parameters for the network coding scheme to activate or deactivate.

Clause 18: The method of any one of Clauses 1-17, further comprising: transmitting signaling, to the network entity, requesting activation or deactivation of network coding involving the cooperative UE.

Clause 19: The method of Clause 18, wherein: the signaling configuring the target UE with at least one set of parameters for a network coding scheme comprises the UE with multiple sets of parameters for the network coding scheme; and the signaling requesting activation or deactivation of network coding involving the cooperative UE indicates at least one of the multiple sets of parameters for the network coding scheme to activate or deactivate.

Clause 20: The method of any one of Clauses 1-19, further comprising: transmitting signaling, to the network entity indicating capability of the target UE for supporting the network coding scheme.

Clause 21: The method of Clause 20, wherein the signaling transmitted to the network entity also indicates one or more triggering factors for at least one of activating or deactivating the network coding scheme.

Clause 22: A method of wireless communication by a cooperative UE, comprising: receiving, from a network entity, signaling configuring the cooperative UE with resources for a sidelink for communicating with a target UE; receiving, while connected to a target UE via the sidelink, network coded sub-packets from the network entity; and transmitting, to the target UE via the sidelink, at least one of the network coded sub-packets or original sub-packets.

Clause 23: The method of Clause 22, wherein: receiving the network coded sub-packets from the network entity comprises receiving a first set of network coded sub-packets; and receiving, from the cooperative UE via the sidelink, at least one of network coded sub-packets or original sub-packets comprises receiving a second set of network coded sub-packets from the cooperative UE.

Clause 24: The method of any one of Clauses 22 and 23, further comprising: receiving signaling configuring the cooperative UE with at least one set of parameters for a network coding scheme. Some examples further include decoding the network coded sub-packets, received from the network entity, based on the parameters for the network coding scheme to recover original sub-packets.

Clause 25: The method of Clause 24, wherein transmitting, to the target UE via the sidelink, at least one of the network coded sub-packets or original sub-packets comprises: transmitting, to the target UE via the sidelink, the recovered original sub-packets.

Clause 26: The method of Clause 24, wherein the parameters for a network coding scheme comprise at least one of: a parameter indicating an encoding and decoding network coding algorithm; or a size of a decodable set of network coded sub-packets associated with a given probability of successful decoding of original packets.

Clause 27: The method of any one of Clauses 22-26, wherein the signaling comprises RRC signaling indicating multiple sets of parameters for the network coding scheme.

Clause 28: The method of Clause 27, further comprising: receiving signaling, via DCI or a MAC-CE, selecting one of the multiple sets of parameters.

Clause 29: The method of any one of Clauses 22-28, wherein the signaling configuring the cooperative UE with resources for a sidelink for communicating with a target UE indicates at least one of: at least one target UE and cooperative UE pair; allocation of resources for sidelink communication; or a sidelink beam pair.

Clause 30: The method of Clause 29, wherein the signaling configuring the target UE for cooperative communication on the sidelink indicates multiple target UE and cooperative UE pairs.

Clause 31: The method of Clause 30, further comprising: receiving signaling, via DCI or a MAC-CE, selecting one of the multiple target UE and cooperative UE pairs.

Clause 32: The method of any one of Clauses 22-31, further comprising: receiving, from the target UE, feedback regarding successful decoding of original packets by the target UE. Some examples further include transmitting the feedback to the network entity.

Clause 33: The method of any one of Clauses 22-32, further comprising: receiving signaling activating or deactivating network coding involving the target UE.

Clause 34: The method of Clause 33, wherein: the signaling configuring the target UE with at least one set of parameters for a network coding scheme comprises the UE with multiple sets of parameters for the network coding scheme; and the signaling activating or deactivating network coding involving the target UE indicates at least one of the multiple sets of parameters for the network coding scheme to activate or deactivate.

Clause 35: The method of any one of Clauses 22-34, further comprising: transmitting signaling, to the network entity indicating capability of the cooperative UE for supporting the network coding scheme.

Clause 36: A method of wireless communication by a network entity, comprising: transmitting signaling configuring a target UE with at least one set of parameters for a network coding scheme; encoding original sub-packets, based on the network coding scheme, to generate network coded sub-packets; transmitting at least a first set of the network coded sub-packets to the target UE; and transmitting at least a second set of the network coded sub-packets to a cooperative UE connected to the target UE.

Clause 37: The method of Clause 36, wherein the parameters for a network coding scheme comprise at least one of: a parameter indicating an encoding and decoding network coding algorithm; or a size of a decodable set of network coded sub-packets associated with a given probability of successful decoding of original packets.

Clause 38: The method of any one of Clauses 36 and 37, wherein the signaling comprises RRC signaling indicating multiple sets of parameters for the network coding scheme.

Clause 39: The method of Clause 38, further comprising: transmitting signaling, via DCI or a MAC-CE, selecting one of the multiple sets of parameters.

Clause 40: The method of any one of Clauses 36-39, further comprising: transmitting signaling configuring the target UE for cooperative communication on the sidelink.

Clause 41: The method of Clause 40, wherein the signaling configuring the target UE for cooperative communication on the sidelink indicates at least one of: at least one target UE and cooperative UE pair; allocation of resources for sidelink communication; or a sidelink beam pair.

Clause 42: The method of Clause 41, wherein the signaling configuring the target UE for cooperative communication on the sidelink indicates multiple target UE and cooperative UE pairs.

Clause 43: The method of Clause 42, further comprising: transmitting signaling, via DCI or a MAC-CE, selecting one of the multiple target UE and cooperative UE pairs.

Clause 44: The method of any one of Clauses 36-43, further comprising: transmitting signaling configuring the cooperative UE to forward the second set of network coded sub-packets to the target UE.

Clause 45: The method of any one of Clauses 36-44, further comprising: transmitting signaling configuring the cooperative UE to decode the second set of network coded sub-packets to recover original sub-packets and to forward the recovered original sub-packets to the target UE.

Clause 46: The method of any one of Clauses 36-45, further comprising: receiving feedback regarding successful decoding of original packets.

Clause 47: The method of Clause 46, wherein the feedback is received via at least one of UCI or a MAC-CE.

Clause 48: The method of Clause 46, wherein the feedback indicates: a last received network coded sub-packet from the network entity; or successful recovery of original packets from the network coded sub-packets.

Clause 49: The method of any one of Clauses 36-48, further comprising: receiving feedback, via the cooperative UE, regarding successful decoding of original packets.

Clause 50: The method of any one of Clauses 36-49, further comprising: transmitting signaling activating or deactivating network coding involving the cooperative UE.

Clause 51: The method of Clause 50, wherein: the signaling configuring the target UE with at least one set of parameters for a network coding scheme comprises the UE with multiple sets of parameters for the network coding scheme; and the signaling activating or deactivating network coding involving the cooperative UE indicates at least one of the multiple sets of parameters for the network coding scheme to activate or deactivate.

Clause 52: The method of any one of Clauses 36-51, further comprising: receiving signaling requesting activation or deactivation of network coding involving the cooperative UE.

Clause 53: The method of Clause 52, wherein: the signaling configuring the target UE with at least one set of parameters for a network coding scheme comprises the UE with multiple sets of parameters for the network coding scheme; and the signaling requesting activation or deactivation of network coding involving the cooperative UE indicates at least one of the multiple sets of parameters for the network coding scheme to activate or deactivate.

Clause 54: The method of any one of Clauses 36-53, further comprising: receiving signaling indicating capability of the target UE for supporting the network coding scheme.

Clause 55: The method of Clause 54, wherein the signaling also indicates one or more triggering factors for at least one of activating or deactivating the network coding scheme.

Clause 56: An apparatus, comprising: a memory comprising executable instructions; and a processor configured to execute the executable instructions and cause the apparatus to perform a method in accordance with any one of Clauses 1-55.

Clause 57: An apparatus, comprising means for performing a method in accordance with any one of Clauses 1-55.

Clause 58: A non-transitory computer-readable medium comprising executable instructions that, when executed by a processor of an apparatus, cause the apparatus to perform a method in accordance with any one of Clauses 1-55.

Clause 59: A computer program product embodied on a computer-readable storage medium comprising code for performing a method in accordance with any one of Clauses 1-55.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a target user equipment (UE), comprising:

receiving, from a network entity, signaling configuring the target UE with at least one set of parameters for a network coding scheme, the signaling comprising radio resource control (RRC) signaling indicating multiple sets of parameters for the network coding scheme;

receiving signaling activating or deactivating network coding involving a cooperative UE, wherein the signaling activating or deactivating network coding involving the cooperative UE indicates at least one set of parameters of the multiple sets of parameters for the network coding scheme to activate or deactivate;

receiving, while connected to the cooperative UE via a sidelink, network coded sub-packets from the network entity, wherein at least some of the network coded sub-packets comprise a combination of original sub-packets;

receiving, from the cooperative UE via the sidelink, the original sub-packets; and decoding the network coded sub-packets received from at least one of the network entity or the cooperative UE, based on the network coding scheme, to recover one or more original packets.

2. The method of claim 1, wherein the parameters for a network coding scheme comprise at least one of:

a parameter indicating an encoding and decoding network coding algorithm; or a size of a decodable set of network coded sub-packets associated with a given probability of successful decoding of original packets.

3. The method of claim 1, further comprising receiving signaling, via downlink control information (DCI) or a medium access control (MAC) control element (CE), selecting one of the multiple sets of parameters.

4. The method of claim 1, further comprising receiving signaling, from the network entity, configuring the target UE for cooperative communication on the sidelink.

5. The method of claim 4, wherein the signaling configuring the target UE for cooperative communication on the sidelink indicates at least one of:

at least one target UE and cooperative UE pair;

allocation of resources for sidelink communication; or a sidelink beam pair.

6. The method of claim 5, wherein the signaling configuring the target UE for cooperative communication on the sidelink indicates multiple target UE and cooperative UE pairs.

7. The method of claim 6, further comprising receiving signaling, via downlink control information (DCI) or a medium access control (MAC) control element (CE), selecting one of the multiple target UE and cooperative UE pairs.

8. The method of claim 1, wherein:

receiving the network coded sub-packets from the network entity comprises receiving a first set of network coded sub-packets; and receiving, from the cooperative UE via the sidelink, at least one of network coded sub-packets or original sub-packets comprises receiving a second set of network coded sub-packets from the cooperative UE.

9. The method of claim 1, wherein:

receiving the network coded sub-packets from the network entity comprises receiving a first set of network coded sub-packets, corresponding to a first set of original sub-packets, from the network entity; and receiving, from the cooperative UE via the sidelink, at least one of network coded sub-packets or original sub-packets comprises receiving a first set of original sub-packets.

10. The method of claim 1, further comprising providing feedback to the network entity regarding successful decoding of original packets.

11. The method of claim 10, wherein the feedback is provided via at least one of uplink control information (UCI) or a medium access control (MAC) control element (CE).

12. The method of claim 10, wherein the feedback indicates:
a last received network coded sub-packet from the network entity; or
successful recovery of original packets from the network coded sub-packets.

13. The method of claim 1, further comprising providing feedback to the cooperative UE regarding successful decoding of original packets.

14. The method of claim 13, wherein the feedback is provided via a sidelink medium access control (MAC) control element (CE).

15. The method of claim 1, further comprising transmitting signaling, to the network entity, requesting the activation or the deactivation of the network coding involving the cooperative UE.

16. The method of claim 15, wherein:
the signaling configuring the target UE with at least one set of parameters for a network coding scheme comprises the UE with multiple sets of parameters for the network coding scheme; and
the signaling requesting activation or deactivation of network coding involving the cooperative UE indicates the at least one set of parameters of the multiple sets of parameters for the network coding scheme to activate or deactivate.

17. The method of claim 1, further comprising transmitting signaling, to the network entity indicating capability of the target UE for supporting the network coding scheme.

18. The method of claim 17, wherein the signaling transmitted to the network entity also indicates one or more triggering factors for at least one of activating or deactivating the network coding scheme.

19. A method of wireless communication by a network entity, comprising:
transmitting signaling configuring a target user equipment (UE) with at least one set of parameters for a network coding scheme, the signaling comprising radio resource control (RRC) signaling indicating multiple sets of parameters for the network coding scheme;
transmitting signaling activating or deactivating network coding involving a cooperative UE, wherein the signaling activating or deactivating network coding involving the cooperative UE indicates at least one set of parameters of the multiple sets of parameters for the network coding scheme to activate or deactivate;
encoding original sub-packets, based on the network coding scheme, to generate network coded sub-packets, wherein at least some of the network coded sub-packets comprise a combination of original sub-packets;
transmitting at least a first set of the network coded sub-packets to the target UE; and
transmitting at least a second set of the network coded sub-packets to the cooperative UE connected to the target UE.

20. The method of claim 19, wherein the parameters for a network coding scheme comprise at least one of:
a parameter indicating an encoding and decoding network coding algorithm; or
a size of a decodable set of network coded sub-packets associated with a given probability of successful decoding of original packets.

21. The method of claim 19, further comprising transmitting signaling, via downlink control information (DCI) or a medium access control (MAC) control element (CE), selecting one of the multiple sets of parameters.

22. A target user equipment (UE) configured for wireless communication, comprising:
at least one memory comprising computer-executable instructions; and
one or more processors configured to execute the computer-executable instructions to cause the target UE to:
receive, from a network entity, signaling configuring the target UE with at least one set of parameters for a network coding scheme, the signaling comprising radio resource control (RRC) signaling indicating multiple sets of parameters for the network coding scheme;
receive signaling activating or deactivating network coding involving a cooperative UE, wherein the signaling activating or deactivating network coding involving the cooperative UE indicates at least one set of parameters of the multiple sets of parameters for the network coding scheme to activate or deactivate;
receive, while connected to the cooperative UE via a sidelink, network coded sub-packets from the network entity, wherein at least some of the network coded sub-packets comprise a combination of original sub-packets;
receive, from the cooperative UE via the sidelink, at least one of network coded sub-packets or original sub-packets; and
decode the network coded sub-packets received from at least one of the network entity or the cooperative UE, based on the network coding scheme, to recover one or more original packets.

* * * * *